United States Patent
MacNaughtan et al.

(10) Patent No.: US 8,463,285 B2
(45) Date of Patent: Jun. 11, 2013

(54) SYSTEMS AND METHODS FOR MOBILE TERMINAL LOCATION DETERMINATION USING PROFILES OF RADIO SIGNAL PARAMETER MEASUREMENTS

(75) Inventors: Malcolm MacNaughtan, Cherrybrook (AU); Christopher Ridgway Drane, Pymble (AU); Craig Andrew Scott, Mortdale (AU); Stephen Brown, West Ryde (AU)

(73) Assignee: WaveMarket, Inc., Emeryville, CA (US)

( * ) Notice: Subject to any disclaimer, the term of this patent is extended or adjusted under 35 U.S.C. 154(b) by 1164 days.

(21) Appl. No.: 11/887,948

(22) PCT Filed: Apr. 10, 2006

(86) PCT No.: PCT/AU2006/000478
§ 371 (c)(1),
(2), (4) Date: Oct. 5, 2007

(87) PCT Pub. No.: WO2006/105618
PCT Pub. Date: Oct. 12, 2006

(65) Prior Publication Data
US 2009/0075651 A1 Mar. 19, 2009

(30) Foreign Application Priority Data

Apr. 8, 2005 (AU) ................................ 2005901735
Jul. 6, 2005 (AU) ................................ 2005903577
Nov. 4, 2005 (AU) ................................ 2005906105

(51) Int. Cl.
*H04W 24/00* (2009.01)
(52) U.S. Cl.
USPC .................. 455/456.1; 455/432.1; 455/3.01; 455/41.2; 340/539.13

(58) Field of Classification Search
USPC ........................................................ 455/456.1
See application file for complete search history.

(56) References Cited

U.S. PATENT DOCUMENTS

| 5,524,136 A | 6/1996 | Barnoy et al. |
| 5,666,651 A | 9/1997 | Wang |

(Continued)

FOREIGN PATENT DOCUMENTS

| AU | 200066612 B2 | 4/2001 |
| DE | 29919376 U1 | 2/2000 |

(Continued)

OTHER PUBLICATIONS

William C. Y. Lee; "Mobile Communications Engineering"; McGraw-Hill Telecommunications, (1982).

(Continued)

*Primary Examiner* — Dwayne Bost
*Assistant Examiner* — Gerald Johnson
(74) *Attorney, Agent, or Firm* — Dovas Law, P.C.

(57) ABSTRACT

Methods and systems for determining whether a mobile radio terminal is on or out of a zone in a radio communications network. The methods and systems provide for generating a profile representative of the zone using measurements taken by the mobile radio terminal and/or the network and/or using predicted values. A comparison is then made between subsequent measurements or values and the profile to make a determination as to whether the mobile radio terminal is in or out of the zone. The methods and systems are applicable to any zone-based application including differential call charging, security applications, buddy finder services, mobile gaming and location based services in general.

54 Claims, 17 Drawing Sheets

U.S. PATENT DOCUMENTS

| | | | |
|---|---|---|---|
| 5,905,953 | A | 5/1999 | Liu et al. |
| 5,950,125 | A | 9/1999 | Buhrmann et al. |
| 5,969,679 | A | 10/1999 | Bolliger et al. |
| 6,061,021 | A | 5/2000 | Zibell |
| 6,073,089 | A | 6/2000 | Baker et al. |
| 6,088,598 | A | 7/2000 | Marsolais |
| 6,104,344 | A | 8/2000 | Wax et al. |
| 6,167,265 | A | 12/2000 | Kim et al. |
| 6,185,422 | B1 | 2/2001 | Mattila |
| 6,201,499 | B1 | 3/2001 | Hawkes et al. |
| 6,205,326 | B1 | 3/2001 | Tell et al. |
| 6,263,208 | B1 | 7/2001 | Chang et al. |
| 6,269,246 | B1 | 7/2001 | Rao et al. |
| 6,330,600 | B1 | 12/2001 | Matchefts et al. |
| 6,360,094 | B1 | 3/2002 | Satarasinghe |
| 6,393,294 | B1 | 5/2002 | Perez-Breva et al. |
| 6,411,819 | B1 | 6/2002 | Gutowski |
| 6,449,257 | B1 | 9/2002 | Choi |
| 6,449,486 | B1* | 9/2002 | Rao ............................ 455/456.1 |
| 6,529,165 | B1 | 3/2003 | Duffett-Smith et al. |
| 6,556,842 | B1 | 4/2003 | Ericsson |
| 6,560,442 | B1 | 5/2003 | Yost et al. |
| 6,567,381 | B1 | 5/2003 | Jeon et al. |
| 6,591,116 | B1 | 7/2003 | Laurila et al. |
| 6,631,262 | B1 | 10/2003 | Wee |
| 6,728,539 | B2 | 4/2004 | Kuwahara |
| 6,748,224 | B1 | 6/2004 | Chen et al. |
| 6,782,265 | B2 | 8/2004 | Perez-Breva et al. |
| 6,799,046 | B1 | 9/2004 | Tang |
| 6,859,654 | B1 | 2/2005 | Reynolds et al. |
| 6,947,734 | B1 | 9/2005 | Toubassi |
| 6,947,835 | B2 | 9/2005 | Kaplan et al. |
| 6,950,664 | B2 | 9/2005 | Chen et al. |
| 6,961,587 | B1 | 11/2005 | Vilppula et al. |
| 7,031,722 | B2* | 4/2006 | Naghian ................. 455/456.1 |
| 7,079,850 | B2 | 7/2006 | Cameron |
| 7,096,115 | B1 | 8/2006 | Groth et al. |
| 7,158,790 | B1 | 1/2007 | Elliott |
| 7,158,798 | B2 | 1/2007 | Lee et al. |
| 7,289,763 | B2 | 10/2007 | Dennison et al. |
| 7,505,433 | B2 | 3/2009 | Yaqub et al. |
| 7,668,832 | B2 | 2/2010 | Yeh et al. |
| 7,697,920 | B1 | 4/2010 | McClain |
| 2001/0022558 | A1 | 9/2001 | Karr, Jr. et al. |
| 2002/0042268 | A1 | 4/2002 | Cotanis |
| 2002/0042269 | A1 | 4/2002 | Cotanis |
| 2002/0111772 | A1 | 8/2002 | Skidmore et al. |
| 2002/0128019 | A1 | 9/2002 | Ben-Yair et al. |
| 2002/0164997 | A1 | 11/2002 | Parry |
| 2002/0168989 | A1 | 11/2002 | Dooley et al. |
| 2002/0173275 | A1 | 11/2002 | Coutant |
| 2002/0193150 | A1 | 12/2002 | Pritchard |
| 2003/0008668 | A1 | 1/2003 | Perez-Breva et al. |
| 2003/0032404 | A1 | 2/2003 | Wager et al. |
| 2003/0040318 | A1 | 2/2003 | Fattouch |
| 2003/0060214 | A1 | 3/2003 | Hendrey et al. |
| 2003/0078042 | A1 | 4/2003 | Miriyala et al. |
| 2003/0078055 | A1 | 4/2003 | Smith et al. |
| 2003/0109274 | A1 | 6/2003 | Budka et al. |
| 2003/0119501 | A1 | 6/2003 | Kim |
| 2003/0125031 | A1 | 7/2003 | Sung Lim et al. |
| 2003/0147362 | A1 | 8/2003 | Dick et al. |
| 2003/0148771 | A1 | 8/2003 | de Verteuil |
| 2003/0186710 | A1 | 10/2003 | Muhonen et al. |
| 2003/0190916 | A1 | 10/2003 | Celedon et al. |
| 2003/0208589 | A1 | 11/2003 | Yamamoto |
| 2004/0018835 | A1 | 1/2004 | Myers et al. |
| 2004/0037258 | A1 | 2/2004 | Scherzer et al. |
| 2004/0132464 | A1 | 7/2004 | Poykko et al. |
| 2004/0152470 | A1 | 8/2004 | Spain |
| 2004/0157621 | A1 | 8/2004 | Yamasaki et al. |
| 2004/0160365 | A1 | 8/2004 | Riley et al. |
| 2004/0185822 | A1 | 9/2004 | Tealdi et al. |
| 2004/0199398 | A1 | 10/2004 | Kubota |
| 2004/0203717 | A1 | 10/2004 | Wingrowicz et al. |
| 2004/0203880 | A1 | 10/2004 | Riley |
| 2004/0203885 | A1 | 10/2004 | Quaid |
| 2004/0225681 | A1 | 11/2004 | Chaney et al. |
| 2004/0248589 | A1 | 12/2004 | Gwon et al. |
| 2005/0012613 | A1 | 1/2005 | Eckstein et al. |
| 2005/0040968 | A1 | 2/2005 | Damarla et al. |
| 2005/0044564 | A1 | 2/2005 | Stopniewicz et al. |
| 2005/0066325 | A1 | 3/2005 | Mori et al. |
| 2005/0113117 | A1 | 5/2005 | Bolin et al. |
| 2005/0134696 | A1 | 6/2005 | Nath et al. |
| 2005/0136938 | A1 | 6/2005 | Kang |
| 2005/0169183 | A1 | 8/2005 | Lakkakorpi |
| 2005/0202821 | A1 | 9/2005 | Pischella |
| 2005/0210342 | A1 | 9/2005 | Schwagmann |
| 2005/0227683 | A1 | 10/2005 | Draluk et al. |
| 2005/0239478 | A1* | 10/2005 | Spirito ...................... 455/456.1 |
| 2005/0282544 | A1* | 12/2005 | Oommen et al. ........ 455/432.1 |
| 2006/0019665 | A1 | 1/2006 | Aghvami et al. |
| 2006/0025068 | A1* | 2/2006 | Regan et al. ................. 455/3.01 |
| 2006/0025158 | A1 | 2/2006 | Leblanc et al. |
| 2006/0052057 | A1* | 3/2006 | Persson et al. ............. 455/41.2 |
| 2006/0064346 | A1 | 3/2006 | Steenstra et al. |
| 2006/0087425 | A1 | 4/2006 | Haeberlen |
| 2006/0205417 | A1 | 9/2006 | Ju et al. |
| 2006/0227045 | A1 | 10/2006 | Sheynblat |
| 2006/0234701 | A1* | 10/2006 | Wang et al. ................ 455/432.1 |
| 2006/0270421 | A1 | 11/2006 | Phillips et al. |
| 2007/0001867 | A1* | 1/2007 | Rowe et al. ............. 340/825.49 |
| 2007/0087764 | A1 | 4/2007 | Buckley et al. |
| 2007/0121520 | A1 | 5/2007 | Shrikhande et al. |
| 2007/0208495 | A1 | 9/2007 | Chapman et al. |
| 2007/0232319 | A1 | 10/2007 | Bells et al. |
| 2007/0259670 | A1 | 11/2007 | Sakhpara |
| 2007/0270168 | A1 | 11/2007 | Sheynblat |
| 2007/0297346 | A1 | 12/2007 | Huismann et al. |
| 2008/0004037 | A1 | 1/2008 | Achlioptas et al. |
| 2008/0061967 | A1 | 3/2008 | Corrado |
| 2009/0182630 | A1 | 7/2009 | Otto et al. |
| 2010/0167725 | A1 | 7/2010 | Noldus et al. |
| 2011/0244919 | A1 | 10/2011 | Aller et al. |
| 2012/0253668 | A1 | 10/2012 | Sheha et al. |

FOREIGN PATENT DOCUMENTS

| | | |
|---|---|---|
| EP | 0431956 A2 | 7/1990 |
| EP | 0874248 | 10/1998 |
| EP | 0936758 A2 | 8/1999 |
| EP | 0982964 A2 | 3/2000 |
| EP | 1030531 A1 | 8/2000 |
| EP | 1120632 B1 | 8/2001 |
| EP | 1137305 | 9/2001 |
| EP | 1175115 A2 | 1/2002 |
| EP | 1235076 A1 | 8/2002 |
| EP | 1271101 A2 | 1/2003 |
| EP | 1304897 A | 4/2003 |
| EP | 0767594 B1 | 11/2003 |
| EP | 1677562 | 7/2006 |
| EP | 2083576 | 7/2009 |
| GB | 2352134 | 1/2001 |
| GB | 2358500 | 7/2001 |
| GB | 2364617 | 1/2002 |
| JP | 07-255079 | 10/1995 |
| JP | 08-265824 | 10/1996 |
| JP | 2001-330657 | 11/2001 |
| JP | 2004-104349 | 4/2004 |
| WO | WO92/02105 | 2/1992 |
| WO | WO93/15569 | 8/1993 |
| WO | WO95/35636 | 12/1995 |
| WO | WO97/11384 | 3/1997 |
| WO | WO98/12885 | 3/1998 |
| WO | WO 9843450 | 10/1998 |
| WO | WO99/13662 | 3/1999 |
| WO | WO00/18148 | 3/2000 |
| WO | WO00/28755 | 5/2000 |
| WO | WO 0049826 | 8/2000 |
| WO | WO01/03372 | 1/2001 |
| WO | WO01/37601 | 5/2001 |
| WO | WO01/99082 | 12/2001 |
| WO | WO 0195592 | 12/2001 |
| WO | WO02/073997 | 9/2002 |
| WO | WO02/082850 | 10/2002 |
| WO | WO03/087869 | 10/2003 |
| WO | WO 2004034721 | 4/2004 |

| WO | WO 2004/047315 | 6/2004 |
| WO | WO 2004/079478 | 9/2004 |
| WO | WO 2004/080105 | 9/2004 |
| WO | WO 2004/084022 | 9/2004 |
| WO | WO 2005/009020 | 1/2005 |
| WO | WO 2005/109695 | 11/2005 |
| WO | WO 2006/026816 | 3/2006 |
| WO | WO 2006/053835 | 5/2006 |
| WO | WO 2006/059188 | 6/2006 |
| WO | WO 2006/087438 | 8/2006 |
| WO | WO 2006/096922 | 9/2006 |
| WO | WO 2006/096923 | 9/2006 |
| WO | WO 2006/105618 | 10/2006 |
| WO | WO 2006/105619 | 10/2006 |
| WO | WO 2006/112561 | 10/2006 |
| WO | WO 2006/125085 | 11/2006 |
| WO | WO 2007/017691 | 2/2007 |
| WO | WO 2007/020635 | 2/2007 |
| WO | WO 2007/040320 | 4/2007 |
| WO | WO 2007040320 | 4/2007 |
| WO | WO 2007/048176 | 5/2007 |
| WO | WO 2007/048177 | 5/2007 |
| WO | WO 2007/051223 | 5/2007 |
| WO | WO 2007/071271 | 6/2007 |
| WO | WO 2007/102816 | 9/2007 |
| WO | WO 2007/115777 | 10/2007 |
| WO | WO 2008/055302 | 5/2008 |
| WO | WO 2008/059570 | 5/2008 |
| WO | WO 2008/109948 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

IEEE VTS Committee; "Coverage prediction for mobile radio systems operating in the 800/900 MHz frequency range"; IEEE Transactions on VTC, vol. 37, No. 1, Feb. 1998.
C. R. Drane; "Positioning Systems, a Unified Approach"; Springer Verlag , 1992.
Simon R. Saunders; "Antennas and propagation for Wireless Communication Systems"; 2ed. Wiley, 2007.
3GPP TR25.942; "Radio Frequency (RF) system scenarios"; Section 5.1.4.; Sep. 1999.
Lundquist et al.; "Evaluation of Positioning Measurement Systems"; TIPI.5/97[98]-110, Dec. 1997, Section 3.2.
Joseph O'Rourke; "Computational Geometry in C"; Cambridge University Press, 2000 ed.
Raymond Steele; "Mobile Radio Communications"; 2 ed.; Wiley & Sons, 1999, Section 2.7; pp. 152-180.
3GPP TR05.08; "Radio Subsystem Link Control"; Nov. 2005.
3GPP SA WG2: "Voice Call Continuity between CS and IMS Study" 3GPP TR 23.806 V7.0 0, Dec. 1, 2005, pp. 1-153, XP002385067.
Mir et al.; "A Zone-based Location Service for Mobile Ad Hoc Networks"; 1 NCC 2004; Jun. 2004.
Munteanu et al.; "Zone Profile Generation for Location Based Services and Traffic Analysis"; 12th WSEAS Conference on Communications; Jul. 2008.
International Search Report dated Sep. 20, 2004 for PCT/AU2004/000983.
European Search Report dated Mar. 15, 2007 for EP04737602.5.
International Search Report dated Dec. 5, 2005 for PCT/AU2005/001358.
International Search Report dated May 7 for PCT/AU2008/000344.
International Search Report dated Apr. 26, 2006 for PCT/AU2006/000347.
International Search Report dated Apr. 26, 2006 for PCT/AU2006/000348.
European Search Report dated Feb. 19, 2010 for EP06721361.1.
International Search Report dated May 31, 2006 for PCT/AU2006/000479.
International Search Report dated Jun. 29, 2006 for PCT/AU2006/000478.
European Search Report dated Dec. 22, 2009 for EP06721360.3.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
International Search Report dated Jan. 15, 2009 for PCT/AU2008/001783.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
European Search Report dated Feb. 19, 2009 for EP06705017.9.
International Search Report dated Nov. 3, 2011 for PCTAU2011/001038.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
European Search Report dated Jul. 23, 2012 for European Patent Application 06790349.2.

* cited by examiner

Leakage area

SYSTEMS AND METHODS FOR MOBILE TERMINAL LOCATION DETERMINATION USING PROFILES OF RADIO SIGNAL PARAMETER MEASUREMENTS

CROSS REFERENCE TO RELATED APPLICATION

This application is the National Phase application of International Application No. PCT/AU2006/000478, filed 10 Apr. 2006, which designates the United States and was published in English, which claims priority to Australian Application No. 2005901735, filed 8 Apr. 2005; Australian Application No. 2005903577, filed 6 Jul. 2005; and Australian Application No. 2005906105, filed 4 Nov. 2005. Each of these applications, in its entirety, is incorporated herein by reference.

TECHNICAL FIELD

This invention relates to methods and apparatus for determining whether a mobile is in a particular geographical region.

PRIORITY DOCUMENTS

The present application claims priority from:
Australian Provisional Patent Application No. 2005901735 entitled "Mobile Location" and filed on 8 Apr. 2005; Australian Provisional Patent Application No. 2005903577 entitled "Enhanced Terrestrial Mobile Location" and filed on 6 Jul. 2005; and Australian Provisional Patent Application No. 2005906105 entitled "Profile Based Communications Service" and filed on 4 Nov. 2005. The entire content of each of these applications are hereby incorporated by reference.

INCORPORATION BY REFERENCE

The following co-pending patent applications are referred to in the following description:
  PCT/AU2005/001358 entitled "Radio Mobile Unit Location System"
  PCT/AU2006/000347 entitled "Enhanced Mobile Location Method and System"; and PCT/AU2006/000348 entitled "Enhanced Mobile Location"
  Co-pending International Patent Application entitled "Mobile Location", claiming priority from Australian Provisional Patent Application No. 2005901735.
The entire content of each of these applications is hereby incorporated by reference.

BACKGROUND

Mobile telephone subscribers are typically charged a flag fall per call as well as a usage fee based on the duration of the call. This timed rate is typically higher than the corresponding rate for users of fixed line networks. In some markets, fixed line callers are charged a fixed fee per call, with no time based fee. As a consequence, mobile subscribers, when at home, frequently use their fixed line service in preference to their mobile phone.

Mobile operators are seeking ways to increase the usage of their networks. One method is to encourage mobile users to continue to use their mobiles even when at home, in preference to fixed line services. To achieve this, mobile operators must lower their charges to be comparable with the fixed line charges. This is sometimes referred to as zone based charging. The mobile subscriber is charged a normal mobile rate while away from home, but a lower rate whilst at home.

In order for this to work effectively, the mobile network must be able to distinguish between when the mobile caller is at home and away from home.

It is therefore an object of the present invention to provide a method and/or system for determining whether a particular mobile is in or out of a particular zone.

SUMMARY OF THE INVENTION

According to one aspect of the present invention, there is provided a method for generating a profile representative of a region about a mobile radio terminal in a radio communications network, the method comprising:
  obtaining at least one value of a plurality of radio signal parameters from the region about the mobile radio; and
  processing the at least one value of the plurality of radio signal parameters to generate the profile representative of the region about the mobile radio terminal.

In one form, the at least one value of the plurality of radio signal parameters is obtained by the mobile radio terminal.

In another form, the at least one value of the plurality of radio signal parameters is obtained by a radio communications network device in the region about the mobile radio terminal;

In a further form, the at least one value of the plurality of radio signal parameters is obtained by intercepting a communication between, the mobile radio terminal and the radio communications network.

In one aspect, the at least one of the plurality of radio signal parameters is a cell ID.

In one form, the step of processing the at least one value of the plurality of radio signal parameters is performed at the mobile radio terminal.

In a further aspect, the step of processing the at least one value of the plurality of radio signal parameters for generating the profile is performed at a network processor of the radio communications network.

In another aspect, the step of processing the at least one value of the plurality of radio signal parameters for generating the profile is performed at a processor external to the radio communications network.

In another form, the at least one value of the plurality of radio signal parameters are transmitted from the mobile radio terminal to the network processor for processing to generate the profile.

In another form, the generated profile is transmitted to the mobile radio terminal.

In another form, a plurality of values of the plurality of radio signal parameters are obtained.

In one aspect, the step of processing comprises averaging the plurality of values.

In another aspect, the plurality of radio parameters comprises one or more of a channel frequency identifier and an identifying code.

In a further aspect, the radio communications network is a GSM system and the channel frequency identifier is the Absolute Radio Frequency Channel Numbers (ARFCN) and the identifying code is a Base Station Identity Code (BSIC).

In one aspect, the at least one value is validated.

In one form of this aspect, the step of validating comprises calculating an approximate location of the mobile radio terminal and comparing the approximate location with a location associated with the region represented by the generated profile.

In another aspect, the approximate location of the mobile radio terminal and the location associated with the region are within a given distance of each other, accepting the at least one measurement, otherwise rejecting the at least one measurement.

In one aspect, the step of obtaining the at least one value of the plurality of parameters is controlled to control the extent of the region.

In another aspect, the step of obtaining the at least one value of the plurality of parameters is controlled by controlling a period of time during which the at least one value of the plurality of radio signal parameters are obtained.

In a further aspect, the step of obtaining the at least one value of the plurality of parameters is controlled by an external operator.

In another aspect, at least one of the plurality of radio signal parameters is an ambiguous radio signal parameter and at least one of the plurality of radio signal parameters is an unambiguous radio signal parameter.

In a further aspect, at least one of the at least one values of the plurality of radio signal parameters is obtained by measurement.

In one form, at least one of the at least one values of the plurality of radio signal parameters is predicted.

According to another aspect of the present invention, there is provided a method for determining whether a mobile radio terminal is within a predefined region, the method comprising:
obtaining at least one value of a plurality of radio signal parameters from a region about the mobile radio terminal;
comparing a profile representing the predefined region with the at least one value of the plurality of radio signal parameters; and
determining whether the mobile radio terminal is within the predefined region on the basis of the comparison.

In one aspect, the at least one value of a plurality of radio signal parameters is obtained by the mobile radio terminal.

In another aspect, the at least one value of the plurality of radio signal parameters is obtained by a radio communications network device in the region about the mobile radio terminal.

In yet another aspect, the at least one value of the plurality of radio signal parameters is obtained by intercepting a communication between the mobile radio terminal and the radio communications network.

In one form, at least one of the plurality of radio signal parameters is a cell ID.

In another form, the step of comparing the profile representing the given region with the at least one value of the plurality of radio signal parameters is conducted by the mobile radio terminal.

In a further form, the step of comparing the profile representing the predefined region with the at least one value of the plurality of radio signal parameters is conducted at a radio communications network element.

In a further form, the step of comparing the profile representing the predefined region with the at least one value of the plurality of radio signal parameters is conducted at a processor external to the radio communications network element.

In a further form, there are a plurality of predefined regions, each having a respective representative profile.

In one form, two or more of the plurality of predefined regions overlap.

In another form, at least one of the at least one value is obtained by measurement.

In a further form, at least one of the at least one value is predicted.

In another aspect of the present invention, there is provided a method for determining whether a mobile radio terminal is within a
predefined region in a radio communications network, the method comprising:
transmitting from the mobile radio terminal, at least one value of a plurality of radio signal parameters of a region about the mobile radio terminal to a processor for comparing with a profile of the predefined region, wherein the at least one measurement of the plurality of radio signal parameters is transmitted only when the determination of whether the mobile radio terminal is in the predefined region is required.

In one aspect, the at least one value of the plurality of radio signal parameters is transmitted upon initiation by a user of the mobile radio terminal.

In another aspect, the at least one value of the plurality of radio signal parameters is transmitted upon the user of the mobile radio terminal initiating a call.

In another aspect, the at least one value of the plurality of radio signal parameters is transmitted upon receiving a request from the radio communications network.

In yet a further aspect, the at least one value of the plurality of radio signal parameters is transmitted upon receiving a request from a processor external to the radio communications network.

In one form, at least one of the at least one value is obtained by measurement.

In another form, at least one of the at least one value is predicted.

According to another aspect of the present invention, there is provided a method for determining whether a mobile radio terminal is within a predefined region in a radio communications network, the method comprising:
comparing at least one value of a plurality of radio signal parameters in a region about the mobile radio terminal with a profile representative of the predefined region;
determining, on the basis of the comparison, whether the mobile radio terminal is within the predefined region; and
transmitting the determination to a processor.

In one form, the processor is a processor in the radio communications network.

In another form, the processor is a processor external to the radio communications network.

In one aspect, the determination is transmitted to the processor upon initiation by a user of the mobile radio terminal.

In another aspect, the determination is transmitted to the processor upon the user of the mobile radio terminal initiating a call.

In a further aspect, the determination is transmitted to the processor upon receiving a request from the radio communications network.

In another form, the determination is transmitted to the processor upon receiving a request from external to the radio communications network.

In another form, the determination is transmitted to the processor upon a change of the determination.

In a further form, the at least one value of at least one of the plurality of radio signal parameters is a measurement.

In yet a further form, the at least one value of at least one of the plurality of radio signal parameters is a predicted value.

According to another aspect of the present invention, there is provided a method for determining whether a mobile radio terminal is within a predefined region in a radio communications network, the method comprising:

obtaining a profile representative of the predefined region;

obtaining at least one value of a plurality of radio signal parameters from a region about the mobile radio terminal; and comparing the at least one value of the plurality of radio signal parameters with the profile to determine whether the mobile radio terminal is within the predefined region.

In one form, the step of comparing comprises:

calculating a cost C associated with the at least one value and the profile and comparing the cost C with a threshold.

In a further form, the cost C is calculated as follows:

$$C = C_m + C_{um} + C_{ur}$$

where $C_n$=Cost associated with cells that are observed and are matched in the profile $C_{um}$=Cost associated with cells that are observed but are not matched in the profile $C_{ur}$=Cost associated with cells that are in the profile but are not reported.

In a further form, each of $C_m$, $C_{um}$ and $C_{ur}$ is calculated as follows:

$$C_m = \sum_{i=1}^{N_m} \frac{(r_{p_i} - r_{o_i})^2}{2\sigma^2}$$

$$C_{um} = \sum_{i=N_m+1}^{N_m+N_{um}} \frac{(r_{p_i} - t_{um})^2}{2\sigma^2}$$

$$C_{ur} = -\sum_{i=N_m+N_{um}+1}^{N_m+N_{um}+N_{ur}} \log\left[\frac{1}{2}\left(1 + \mathrm{erf}\left(\frac{t_{ur} - r_{p_i}}{\sqrt{2}\,\sigma}\right)\right)\right]$$

Where $r_{p_1}$=The expected value of the signal strength (dBm) of the $i^{th}$ cell, as entered into the profile, $r_{o_1}$=The observed value the signal strength (dBm) of the $i^{th}$ cell, $t_{um}$=a fixed value (in dBm) that represents the value of signal strength such that it is unlikely that a cell will be not be observed in the profile if the cell's expected signal strength is above $t_{um}$, $t_{ur}$=a fixed threshold (in dBm)

σ=scaling parameter, and erf=the standard error function and where $N_m$=Number of observations that are matched in the profile, $N_{um}$=Number of observations that are not matched in the profile, $N_{ur}$=Number of cells that are in the profile but are not reported.

A method as claimed in claim 55 wherein:

If $C < \chi^2 (x, N_T - 2)$ then in Zone otherwise, not in Zone.

where $\chi^2$ is the standard statistical function, $N_T = N_m + N_{um} + N_{ur}$ x=a percentage between 0 and 100.

According to a further aspect of the present invention, there is provided a method of controlling the performance of a system for determining whether or not a mobile radio terminal is within a predefined region in a radio communications system, the method comprising:

associating a threshold with a ratio of a probability of an Out-Given-In error and a probability of an In-Given-Out error; and adjusting the threshold to achieve a desired performance.

In one form, the threshold may be adjusted from about 0% to about 100%.

According to another aspect of the present invention, there is provided, in a system for determining whether or not a mobile radio terminal is within a predefined region in a radio communications system, the predefined region having a transition region between an in-region and an out-region, a method for controlling the size of the transition region, the method comprising:

associating a threshold with a ratio of a probability of an Out-Given-In error and a probability of an In-Given-Out error; and adjusting the threshold to control the size of the transition region.

In one form, the threshold may be adjusted from about 0% to about 100%.

According to a further aspect of the present invention, there is provided, in a system for determining whether or not a mobile radio terminal is within a predefined region in a radio communications system, a method for controlling the size of the predefined region, the method comprising:

associating a threshold with a ratio of a probability of an Out-Given-In error and a probability of an In-Given-Out error; and adjusting the threshold to control the size of the predefined region.

In one form, the threshold may be adjusted from about 0% to about 100%.

In another form, the size of the region decreases as the probability of in-given-out errors increases.

According to a further aspect of the present invention, there is provided a method of defining a region within a radio communications network having at least one cell, the method comprising defining the region independently of a location and/or orientation of the cell and/or a sector of the cell.

In one form, the method comprises generating a profile representative of the region about a mobile radio terminal within the cell.

In one aspect, the step of generating the profile is performed using the method of the first aspect of the present invention.

A method of translating a zone expressed as one or more geographic coordinates into a zone expressed using one or more radio signal parameter values and/or ranges associated with a cell site in the vicinity of the zone, in a radio communications network, the method comprising:

correlating the one or more geographic coordinates with one or more cell sites of the radio communications network; and predicting one or more radio signal parameter values and/or ranges in the correlated one or more cell sites.

In one form, the one or more geographic coordinates are a latitude and/or a longitude.

In another form, the one or more geographic coordinates are is a street address.

In one aspect, the step of correlating the one or more geographic coordinates with the one or more cell site is by way of a lookup table.

According to a further aspect of the present invention, there is provided a method of defining a region in a radio communications network, wherein the region may be defined in the vertical dimension.

In one aspect, the extent of the region in the vertical dimension may be controlled.

In a further aspect, wherein the region is defined by a profile.

In one form, the profile is generated according to the method of the first aspect of the present invention.

According to a further aspect of the present invention, there is provided, in a radio communications network for receiving transmissions from a mobile radio terminal, a method of controlling a communications load on the radio communications network, the method comprising:

controlling the rate at which the mobile radio terminal transmits data to the radio communications network.

In one form, the mobile radio terminal transmits data relating to radio signal parameters about the mobile radio terminal.

In another form, the mobile radio terminal transmits the data upon a user of the mobile radio terminal initiating the transmission of the location data.

In a further form, the mobile radio terminal transmits the data upon a user of the mobile radio terminal initiating a call to the radio communications network.

In yet a further form, wherein the mobile radio terminal transmits the data upon a request from the radio communications network.

In another form, the mobile radio terminal transmits the data upon a request from a processor external to the radio communications network.

In another form, the mobile radio terminal transmits the data upon a change of the data.

In a further form, the mobile radio terminal transmits the data upon the mobile radio terminal moving out of or in to a predefined region within the radio communications network.

According to a further aspect of the present invention, there is provided a method for operating a service wherein the location of one or more subscriber terminals relative to another location or subscriber is monitored, and actions taken when the proximity meets a criteria, wherein the processing to monitor the proximity of one or more target terminal to another terminal is carried out on the one or more target terminal.

According to another aspect of the present invention, there is provided a system capable of performing the method of any one or more of the above aspects of the present invention.

A machine readable medium containing instructions to cause a machine to perform the method of any one or more of the above aspects of the present invention.

In one form the machine readable medium is a Subscriber Identity Module (SIM).

BRIEF DESCRIPTION OF THE DRAWINGS

Various aspects of the present invention will now be described in detail with reference to the accompanying drawings in which.

DETAILED DESCRIPTION

The present invention will now be described in detail with reference to one or more embodiments of the invention, examples of which are illustrated in the accompanying drawings. The examples and embodiments are provided by way of explanation only and are not to be taken as limiting to the scope of the invention. Furthermore, features illustrated or described as part of one embodiment may be used with one or more other embodiments to provide a further new combination. It will be understood that the present invention will cover these variations and embodiments as well as variations and modifications that would be understood by the person skilled in the art.

Throughout this specification, the term "mobile radio terminal" is used synonymously with terms such as "mobile phone", "cell phone" or "handset", and will be understood to encompass any kind of mobile radio terminal such as a cell phone, Personal Digital Assistant (PDA), lap top or other mobile computer, or pager.

Figure 1:
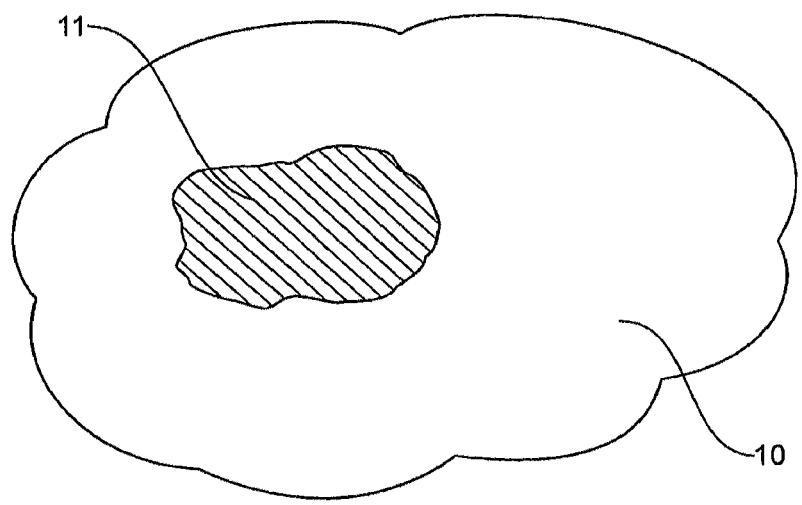
FIG. 1—shows a radio communications network in which a zone is defined.

FIG. 1 illustrates a radio communications network 10, in which a region or zone 11 is defined. The system according to one form of the invention determines whether the mobile subscriber is within the zone or not. From that determination, numerous uses and applications may be used as will be described in more detail below.

Figure 2:
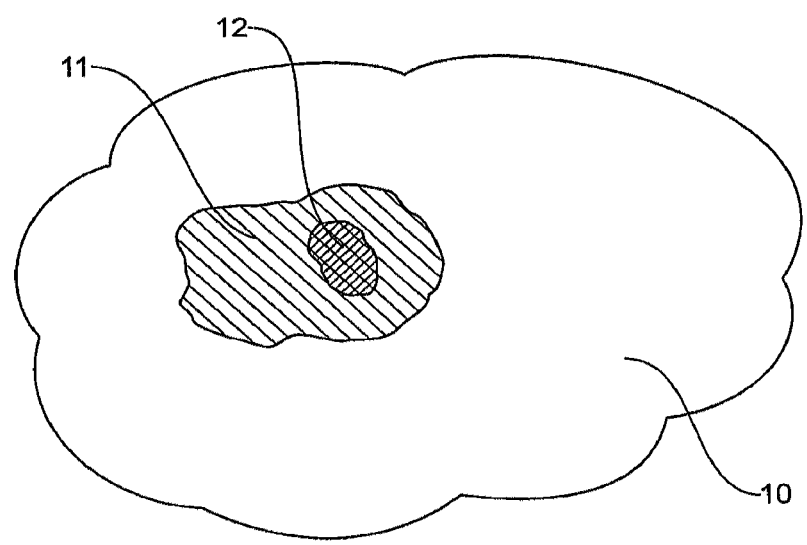
FIG. 2—shows a radio communications network in which two overlapping zones are defined.

In addition to a single zone, multiple zones can be defined and supported simultaneously, including for example, home, work and other zones. In addition a zone could be defined and operated as an exclusion rather than inclusion zone. It is also contemplated that there could be zones within zones or partial overlap of zones. For example, as illustrated in FIG. 2, there is shown radio communications network 10 in which is defined a school zone 11 that provides one differential rate for users in that school zone for students, and that student could have another differential rate within the home zone 12 that could be within the school zone.

Figure 3:
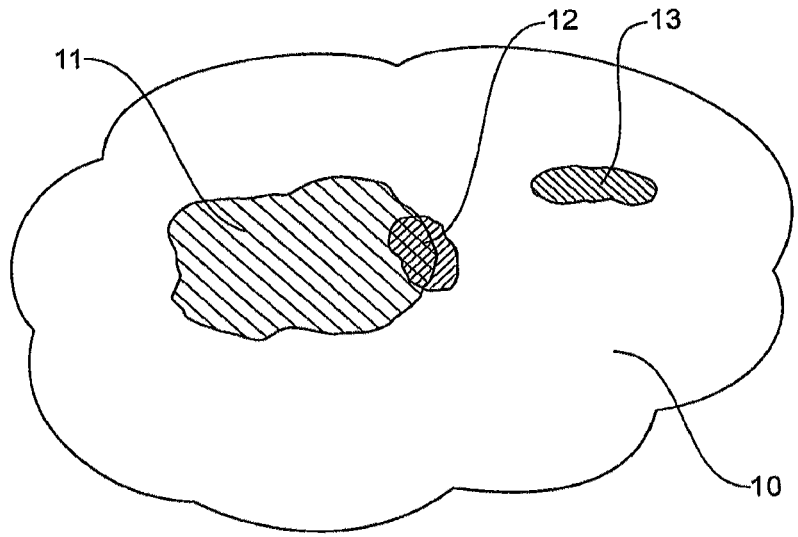
FIG. 3—shows a radio communications network in which two overlapping zones and one separate zone are defined.

In a further embodiment, as shown in FIG. 3, the student's home zone 12 might only partially overlap the school zone 11. In this case, the home zone may not be restricted to the actual area of the home, but may extend to the area of the block on which the home is situated. In this case, the service provider may charge a higher rate for a larger home zone. FIG. 3 also shows a third zone 13 defined and associated with the student, which may for example, be the home of a friend where the student may spend time after school. The service provider may apply a third rate for this further zone 13.

Figure 4:
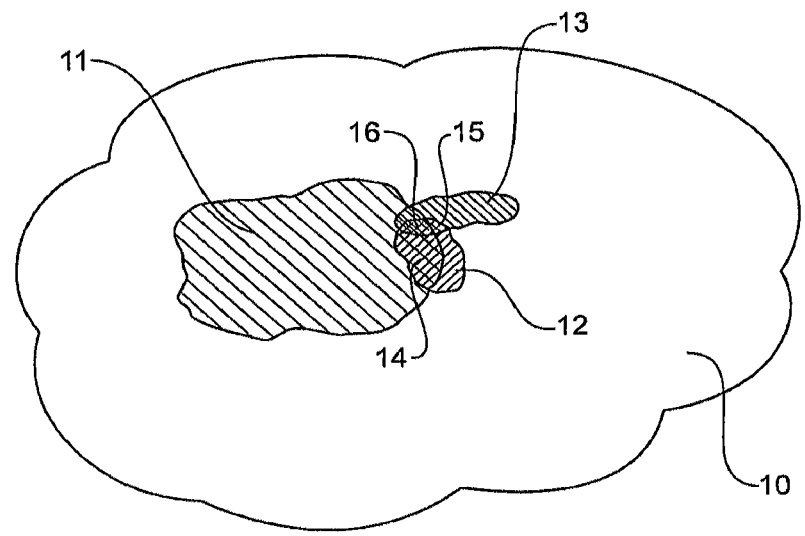
FIG. 4—shows a radio communications network in which three overlapping zones are defined.

In FIG. 4, all three zones 11, 12 and 13 overlap partially. The way in which this overlap is treated by the service provider might present a number of service contract offers. For example, the service provider may offer that the applicable rate for a call or other transaction within the overlap region is that of the lowest rate of any overlapping zone. For example, the school zone 11 rate might be the lowest, the home zone 12 rate might be higher and the "friend zone" 13 rate might be the highest. In the region 14 being the overlap of school zone 11 and home zone 12, the applicable rate might be that of the school zone 11. In the region 15 being the overlap of the home zone 12 and the friend zone 13, the applicable rate might be that of the home zone 12, while in the region 16, being the overlap of all three zones, the applicable rate might be that of the school zone 11, being the lowest rate of all three.

Figure 5:
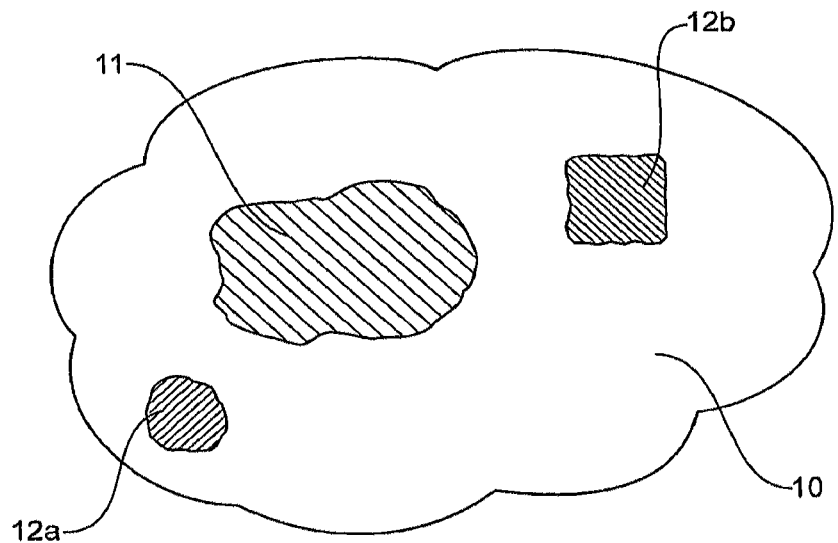
FIG. 5—shows a radio communications network in which three separate zones are defined.

FIG. 5 shows a further embodiment in which all zones are non-overlapping. In this case for example, there is provided a school zone 11 and two home zones 12a and 12b. Such a situation may arise for example where the student's parents are separated and the student lives part time in two homes. In this case, the same rate for home zone 12a might apply to home zone 12b. Of course it will be understood that any other combination of rate applications is also possible.

Furthermore, when processing that is described as being carried out in a mobile, it will be understood that the processing could be carried out in any combination of the handset, the Subscriber Identification Module (SIM) that is inserted in the handset, an additional processor or smart card inserted into the handset. It will also be understood that much of the processing that occurs in the implementation of various aspects of the present invention can also be distributed, or partially distributed, between the handset, one or more network elements within the radio communications network and/or one or more elements outside the radio communications network.

It will also be understood that the invention may be applied to any application in which a particular region within the radio communications network is required to be defined. This region can include, but is not limited to, a zone as will be understood by the person skilled in the art. While various aspects and embodiments of the present invention will be described with reference to a zone, it will be understood that the invention could be applied to a broader region, or a more narrowly-defined region than in the embodiments defined herein.

Most existing location systems are transaction orientated. When an application needs to know the location of the mobile, a transaction is initiated with the location system to obtain the current geographical location of the mobile. This means that each time the subscriber initiates a call, the location of the mobile must be measured to determine whether the at home (or within a zone) or mobile rate should be applied. If zone based differentiation is also to be applied to calls terminating at the mobile then a location transaction is also required for each incoming call.

Typical location transaction costs are comparable to a short mobile call. Therefore if the mobile operator charges the subscriber a low, fixed amount for calls from the home zone, most or all of this revenue may be absorbed in fees to the location system provider for the transaction that determined whether the caller was at home or not. This transaction orientated approach adds a location transaction cost to every call which either the mobile operator or the mobile subscriber must pay.

Using location systems to support zone based mobile charging may also be problematic because of capacity constraints of the location system. Although location systems offering capacities of a few transactions per second are sufficient for certain markets, more transactions per second will be required for larger markets.

If the location system is also required to support zone based charging, the workload for the location system will be increased dramatically, in proportion to the total call initiation rate in the network. In most cases this represents an increase of several orders of magnitude. Given that the cost of this additional workload is not directly chargeable to the subscriber, the significant expenditure required to add the location system capacity has to be largely borne by the mobile operator.

Issues with using conventional mobile location systems for use in differential charging may also arise from the latency associated with the location calculation. Typically, location systems may take several seconds or more to compute a location fix for a mobile. This delay typically increases with increasing volumes of location requests.

If the current location of the mobile is to be used to alter the handling of either mobile originated or mobile terminated calls, the latency associated with the location determination becomes a factor in the overall service quality, for example, a delay of several seconds in call setup.

Existing location methods can be adapted to the problem of determining whether a mobile lies in a particular zone. An approach is to calculate the estimated location of the mobile and then compare this estimated location with a geometrical description of the zone. For example, if the zone is a one kilometer by one kilometer box, centred on a person's home, then the algorithm would simply check if the mobile location estimate lies within that zone.

However, if the zone is made very small, then there is likely to be a very high error rate in the zone determination due to the inherent random errors in the location estimation process. With such an approach, the only way to decrease the error rate is to arbitrarily increase the size of the zone.

There are two general types of error that can be made by such a system. The first type of error is In-Given-Out, which occurs when the system decides that the mobile is out of the zone when it is really in the zone. The second type of error is Out-Given-In, which occurs when the system decides that the mobile is in the zone when it is really out. In a home-zone application, an Out-Given-In error may cause revenue leakage, that is, a person being charged using a lower "at home" rate when they should have been charged at a higher mobile call rate. An In-Given-Out error in a home zone application may lead to a customer being charged at a higher rate when they are actually at home instead of a discount rate, leading to customer dissatisfaction.

These two types of errors are related in the sense that adapting the system to optimise the rate of one type of error will typically have a detrimental effect on the rate for the other type of error. Another limitation of using existing location systems for a zone determination application is that there is no direct means of adjusting the system to achieve a desired compromise between the rates of the two error types. The rates in this case are a function of the inherent accuracy of the location fixes and the dimensions of the zone.

According to one aspect of the present invention, improvements over cell ID systems are gained by incorporating additional information in the form of other radio signal parameter measurements in determining a given region or zone. These parameters may be one or more signal power or timing measurements.

In one embodiment of this aspect, the measurement or measurements are made by the mobile radio terminal, or mobile. This allows the additional measurements to be taken at all times, including when the mobile is idle. In a further form of this aspect of the invention, the processing of the taken measurement or measurements is conducted at the mobile terminal. This eliminates or reduces the need to transmit the measurements to a remote decision making element, reducing the cost in terms of network capacity and further reducing battery power consumption.

Figure 6:
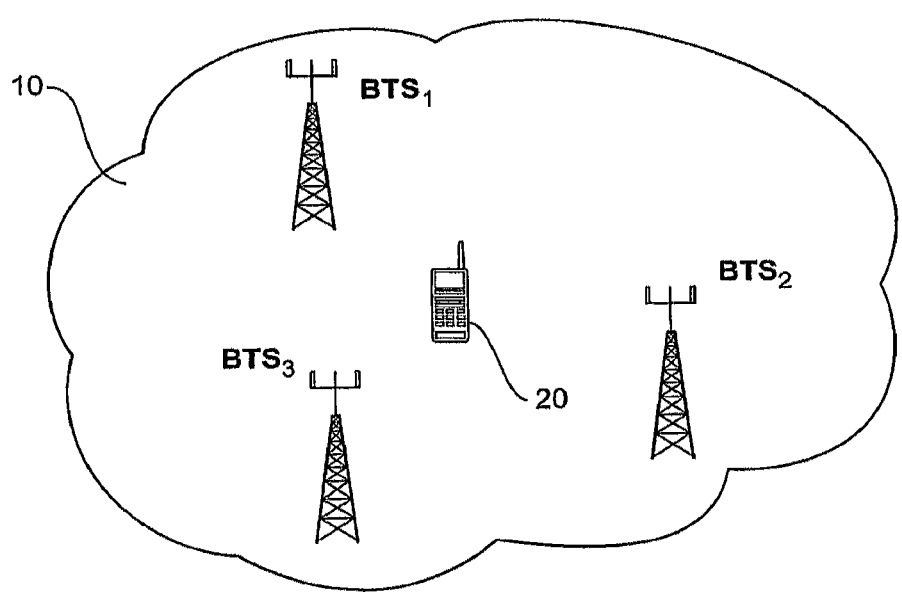
FIG. 6—shows an exemplary arrangement of one form of the present invention in which radio signal parameter measurements are taken and processed by the mobile radio terminal.

FIG. 6 shows a part of an exemplary radio communications network 10 having transmitters or base transceiver stations $BTS_1$, $BTS_2$ and $BTS_3$. Also shown in FIG. 6 is mobile radio terminal 20.

In another form of the present invention, the mobile radio terminal 20 may make the one or more measurements of one or more signal parameters associated with surrounding cells as previously described, but in this form, the measurements may be communicated to another processor such as a network server for processing the measurements to determine the extent of the zone.

Figure 7:
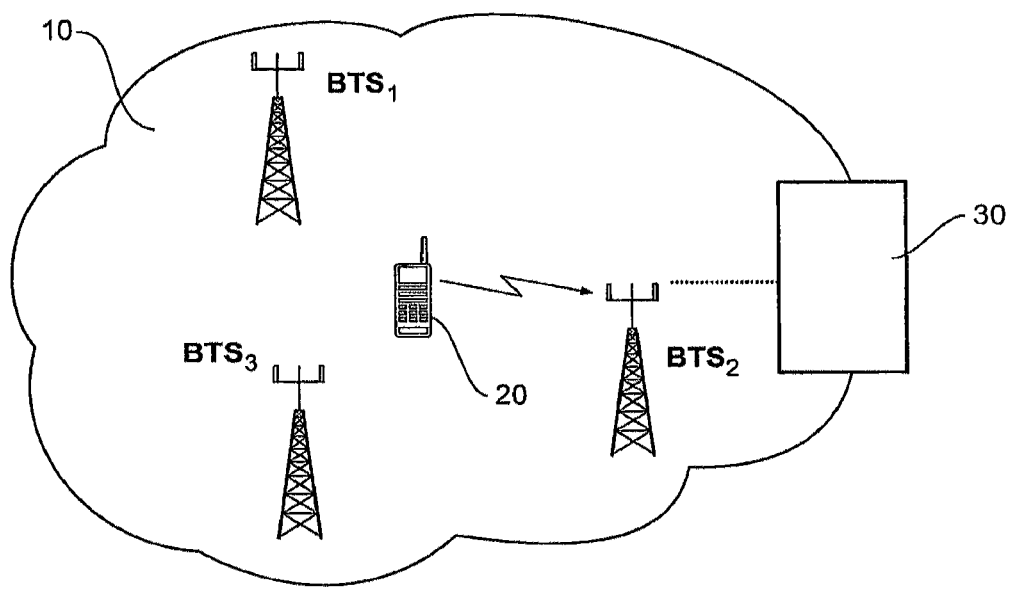
FIG. 7—is a process flow chart of the method used in generating a profile using measurements.

FIG. 7 shows the arrangement where mobile radio terminal 20 in network 10 communicates its measurements to network server 30, for example via $BTS_2$. The transmission of the measurements may be optimized to minimise the consumption of network capacity by sending messages only when they are likely to be needed. Sending measurements only when required also serves to minimize mobile terminal battery drain. For example, the transmission could be triggered by the subscriber initiating a call, thereby only sending the information when it is required to determine the zone status for rating a call. Alternatively the transmission could also be triggered by the subscriber from a menu item on the terminal. Yet another alternative is for the transmission to be triggered by a request from the network based server on an as needed basis. The act of unlocking the mobile terminal keypad by the subscriber might also be used as a suitable trigger for this transmission.

Figure 8:
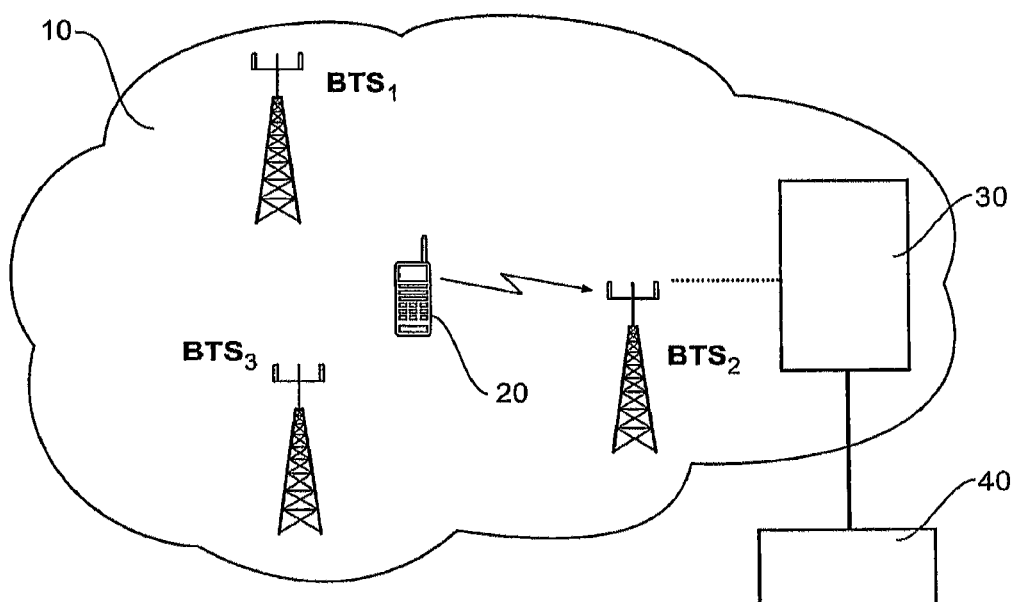
FIG. 8—is a process flow chart of the method used in generating a profile using a network model.

In a further form, and as illustrated in FIG. 8, the measurements could be collected by mobile radio terminal 20 and sent to a network server 30, which then sends the measurements either unprocessed or partially processed, to an external processor 40 for complete or further processing. The results of the processing could then be sent to the network server 30 and/or mobile radio terminal 20. In certain embodiments, the external processor 40 may be a third party system or may be part of the service provider's system. Of course any other combination of data transmission paths could be used.

In yet a further embodiment of the present invention, the measurement or measurements may be obtained by the network 10 itself. In one form, the measurement that may be obtained by the network is a round trip delay value such as a Timing Advance (TA) measurement in the case of a GSM system. Similar measurements may be obtained in other systems such as RTT in UMTS. In another form, the measurements may be made directly in the network by measuring receivers that intercept radio transmissions from the mobile.

Alternatively, the measurements may be obtained by intercepting messages sent form the mobile to the network 10, containing measurements from the mobile radio terminal 20. An example is the Network Measurement Report (NMR) sent by a GSM mobile terminal periodically while in communication with the network. These messages can be intercepted using signaling probes for instance on the ABIS interface between BTS and BSC in GSM as will be understood by the person skilled in the art.

Once the measurement or measurements have been made, a profile representative of the area surrounding the mobile radio terminal 20 is generated. By profile, it is meant a quantitative characterization of the zone in terms of the radio parameters that may be measured by a mobile terminal. A profile may typically consist of multiple elements relating to cells in the vicinity of the zone and to the different types of parameters that may be measured by a terminal. The elements of the profile are generally designed to reflect typical parameter values that may be observed in the zone, optionally with some representation of the expected variation of the parameter values within the zone. For example, in the case of cell identification parameters, the profile may contain one or more cell ID values. If more than one cell identifier is included, this reflects the expected variation in the identifiers that may be measured by a terminal in the zone.

Optionally the cell identifiers may be associated with weights which reflect the relative likelihood of the associated cell identifiers to be measured. As another example, if a signal level for a particular cell features in the profile, then a mean value for the received signal level from that cell may be included in the profile. Optionally a representation of the expected variation within the zone may also be included in the profile. This may be designed to accommodate variations due to radio channel phenomena such as fading, interference as well as seasonal variations and manufacturing tolerances between mobile terminals.

One suitable representation for the received signal level is a statistical log normal distribution as is well known in the art for modeling radio signal power variations. The parameters of this model are the mean and standard deviation. Values for the standard deviation typically range between a few dB and 20 dB, depending on the degree of variation anticipated. Alternative models, known in the art include Rayleigh and Rician distributions. These may be suitable depending on the specific application. For example, a zone associated with an indoor or mixed area may be more suitably modeled with a Rayleigh distribution since there is a lesser likelihood of a direct line of sight to the cell antenna. Conversely a zone associated with chiefly outdoor areas may be more suitably characterised with a Rician model. For timing parameter measurements, alternative models may be suitable. In one situation, a Gaussian model may be suitable however alternative models are known in the art for the distribution of radio signal timing measurements. Alternative representations of the typical parameter values may also be suitably applied such as a median. The expected variation may also be suitably represented by other measures such as inter-quartile range.

Figure 9:
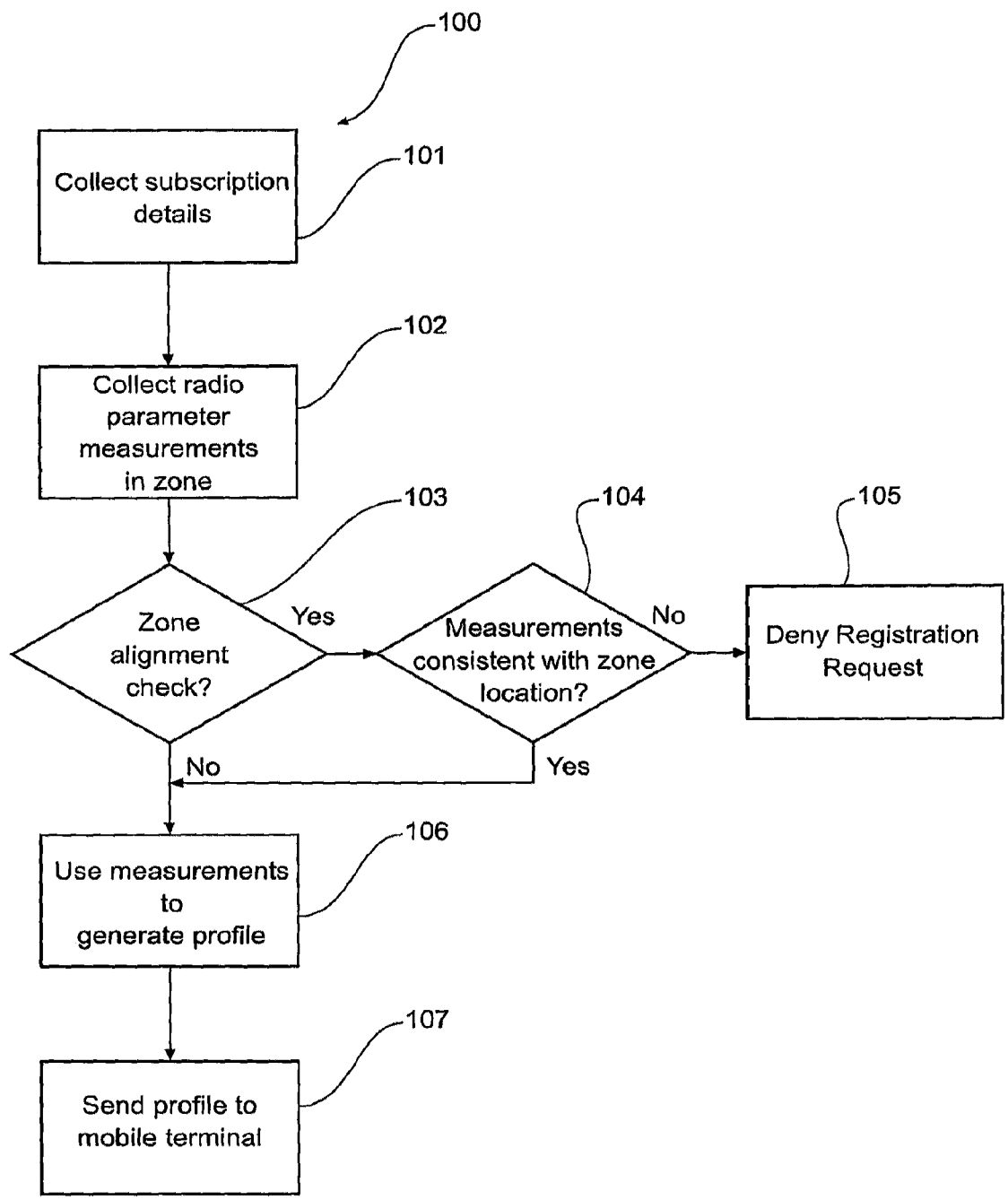
FIG. 9—shows an exemplary arrangement of another form of the present invention in which radio signal parameter measurements are processed by a network server.

The profile defining a zone may be derived in one of several ways:

In one embodiment, the profile is derived from measurements made by the subscriber's or user's mobile radio terminal 20 from within their zone. This measurement process may be initiated by the subscriber selecting a menu entry on their mobile radio terminal 20. Alternatively the process may be initiated remotely by network based server 30. An example of such a set of measurements is provided below. The process of deriving the profile in this case is as illustrated in FIG. 9, which illustrates process 100. In an optional first step 100, subscription details for the subscriber of the mobile radio terminal are collected. In step 102, the mobile radio terminal collects radio parameter measurements within its zone or region. The mobile radio terminal will then transmit these measurements to a network processor for example. An optional step 103 is for the network processor to conduct a zone alignment check as described in more detail below to ensure that the measurements are valid. If the check is done, and the measurements are deemed to be valid (104), the system will proceed to generate the profile at step 106. If the measurements are deemed to be invalid (i.e. inconsistent with the zone location), the registration request is denied at step 105. Once the profile has been generated, it is, in this example, sent to the mobile radio terminal.

Figure 10:
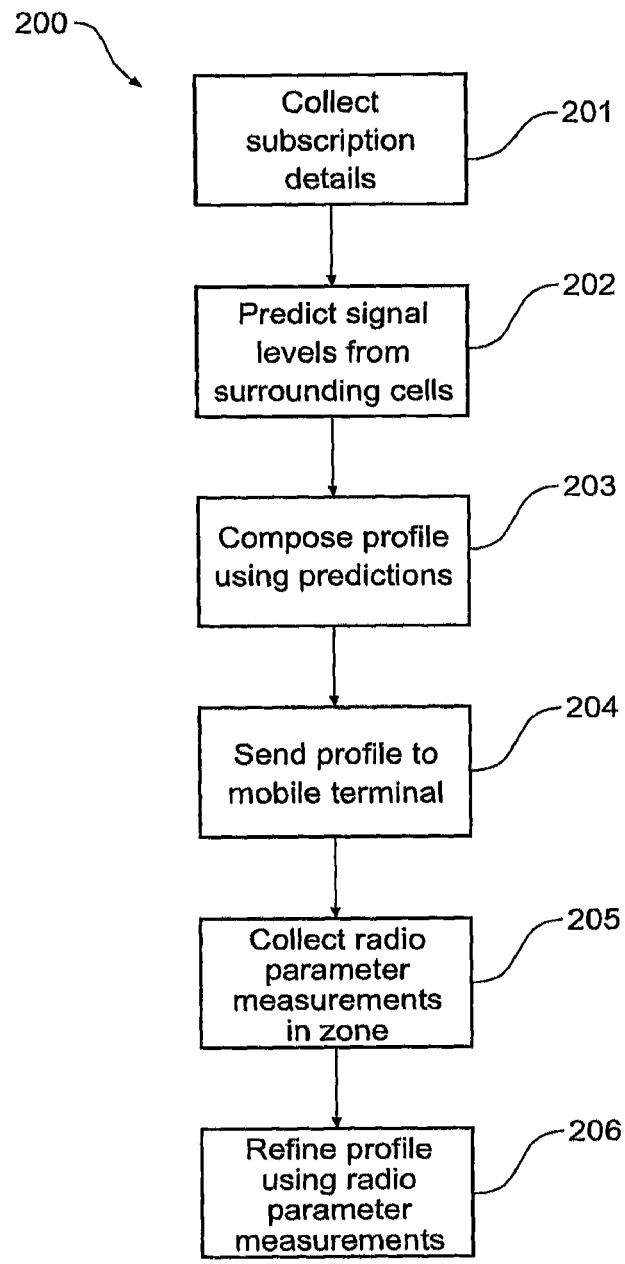
FIG. 10—shows an exemplary arrangement of another form of the present invention in which signal parameter measurements are processed by a processor external to the network.

In another embodiment, the profile may be generated entirely by radio network propagation modeling as well known in the art. The process is illustrated in FIG. 10. The desired location for the zone as well as the desired extent is used in the prediction process as illustrated in FIG. 10. The model uses information on the configuration of the radio network including the location of cell sites, the height and orientation of cell antennas, the radiation pattern of the antennas as well as the channel frequencies and any other codes allocated to each cell. The model also covers the loss in signal power as radio signals travel from transmitter to receiver. Such models are well known in the radio communications field and can be found in most advanced level texts on the subject. Predicted received signal powers can be generated for any or all cells in the network. These power levels can also be used to derive interference level estimates so that the received quality of a signal from any particular cell can be predicted. The application of network model for predicting received signal levels and interference levels is well known to those skilled in the art of cellular radio network design. Detailed references exist in the literature including, W. C. Y. Lee, *Mobile Communications Engineering*. McGraw-Hill, 1982, and P. L. H. A. S. Fischer, *Evaluation of positioning measurement systems*," T1P1.5/97-110, December 1997, and IEEE VTS committee, *Coverage prediction for mobile radio systems operating in the* 800/900 *MHz frequency range*, IEEE Transactions on VTC, Vol 37, No 1, February 1998. The entire contents of these references are hereby incorporated by reference.

In one application where the zone is required to service a subscriber's home, the location may be specified as the latitude and/or longitude corresponding to the home. Alternatively the location may be specified as the civic address of the home and a lookup performed on a lookup table to translate this into the same coordinate frame in which the network cell site locations are defined. The predicted received signal levels for all cells, as received in the zone are compared and a detectability criterion applied to select those cells that are likely to be measured and reported by a mobile terminal. Typically the detectability criterion would be a predicted carrier to interference (including noise) value greater than a threshold. For example in a GSM network, a C/(I+N) threshold of +9 dB could be applied. For a UMTS network, the equivalent threshold could be a CPICH Ec/I0 level of −20 dB. Other threshold values depending on the network and application may range from about −26 dB to about +15 dB, (for example, −26 dB to −12 dB, −22 dB to −6 dB, −20 dB to −12 dB, −15 dB to 0 dB, −12 dB to +3 dB, −6 dB to +12 dB, −3 dB to +15 dB and +3 dB to +15 dB etc.).

Alternative criteria such as comparing predicted power levels against a threshold or selecting a number of the strongest predicted cells could also be employed. The present embodiment illustrates a feature of this invention, which is to serve as a translator for zone definitions. It is often convenient for operators and users of zone services to conceive of zone locations and extents in spatial terms, most commonly in terms of a geographic coordinate frame or alternatively in spatial terms with reference to some landmark, perhaps a street address. The radio parameter measurements which actually serve to define the zone span an entirely different dimension however. The present embodiment provides a translation facility between the terms in which operators and users describe a zone and the actual radio parameter measurements needed to operate such a zone. In less precise zone systems where for instance the zone is defined simply in terms of the serving cells, this translation although necessary, may not be complex and therefore can be done mentally or by hand if the locations of the cell sites in the vicinity of the zone are known. For precise zone definitions however, where additional radio parameter measurements must be used to achieve the finer spatial discrimination, this translation process becomes significantly more complex. One aspect of the present invention provides this complex translation facility.

In the process 200 shown in FIG. 10 then, again, the optional step of collecting subscriber details is performed at step 201. In step 202, signal levels from surrounding cells are then predicted, and a profile is composed in step 203 using these predicted levels. The generated profile is then transmitted to the mobile radio terminal in step 204. In the optional further steps, the mobile radio terminal may collect radio parameter measurements in its zone in step 205 and use these to refine the profile in step 206. During this refinement phase, measurements are obtained from the mobile terminal and used to adjust the parameters in the profile. In this case the signal level and statistical scaling parameter in the profile would be adjusted based on the mean and variance of received levels measured for each of the cells.

Figure 11:
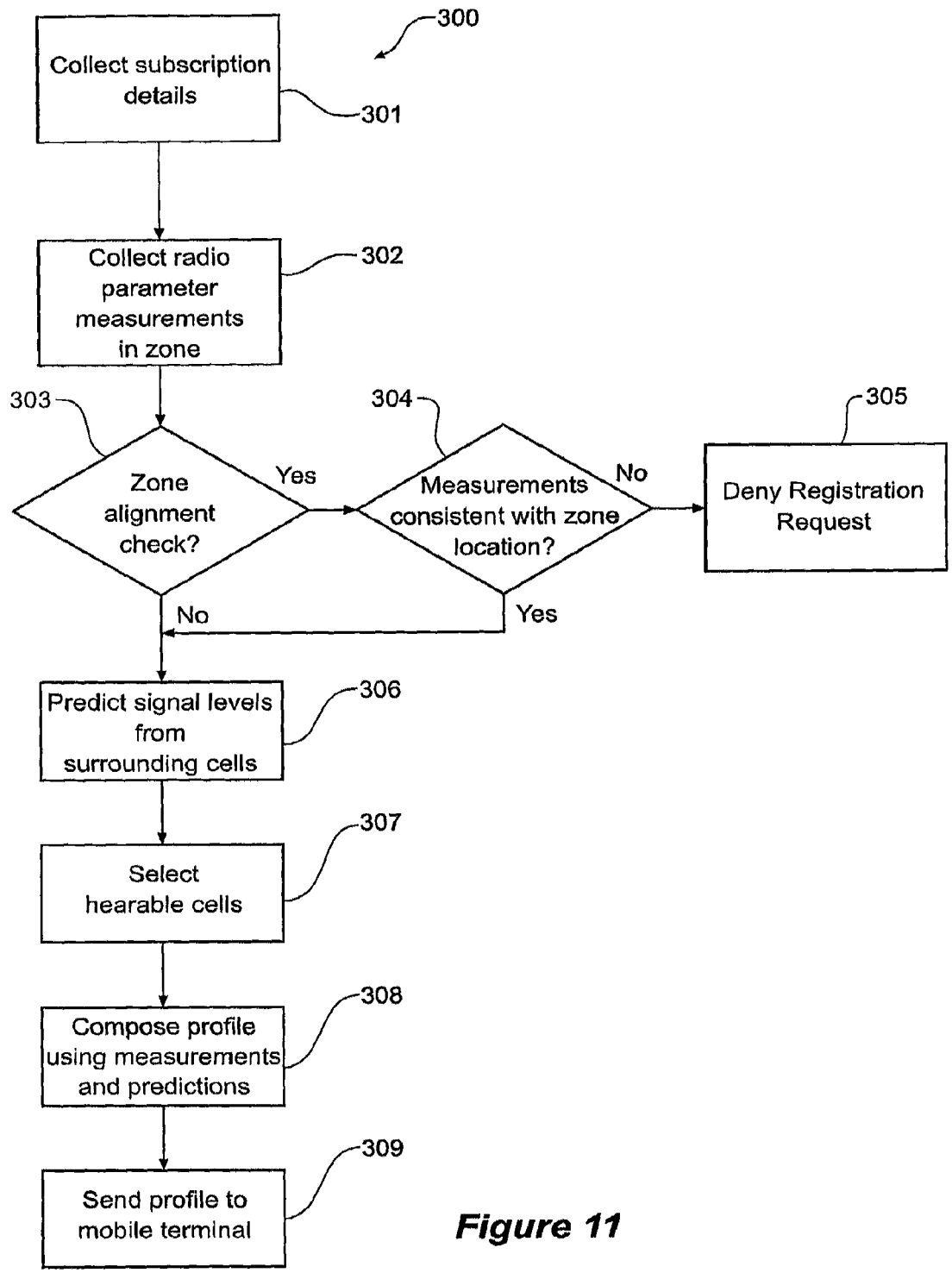
FIG. 11—is a process flow chart of the method used in generating a profile using both measurements and predictions.

In another embodiment, illustrated in FIG. 11, the profile may be generated using both measurements as well as predictions generated by a radio network model. In one form of this aspect, the reported measurements are analysed and any cells that were not reported but are deemed likely to be measured in the zone based on the predictions are added to the profile by the server. An example of this is also provided below.

In process 300 illustrated in FIG. 11 then, again, the optional step of collecting subscriber details is performed at step 301, and the mobile radio terminal 20 collects radio parameter measurements in its zone at step 302. As in process 100 illustrated in FIG. 9, this process may optionally validate the measurements taken by the mobile radio terminal in steps 303, 304 and 305 as before. In step 306, the system predicts the signal levels from surrounding cells, selects hearable cells in step 307 and generates a profile using both the measurements and predictions in step 308. The generated profile may then be sent to mobile radio terminal in step 309.

Figure 12:
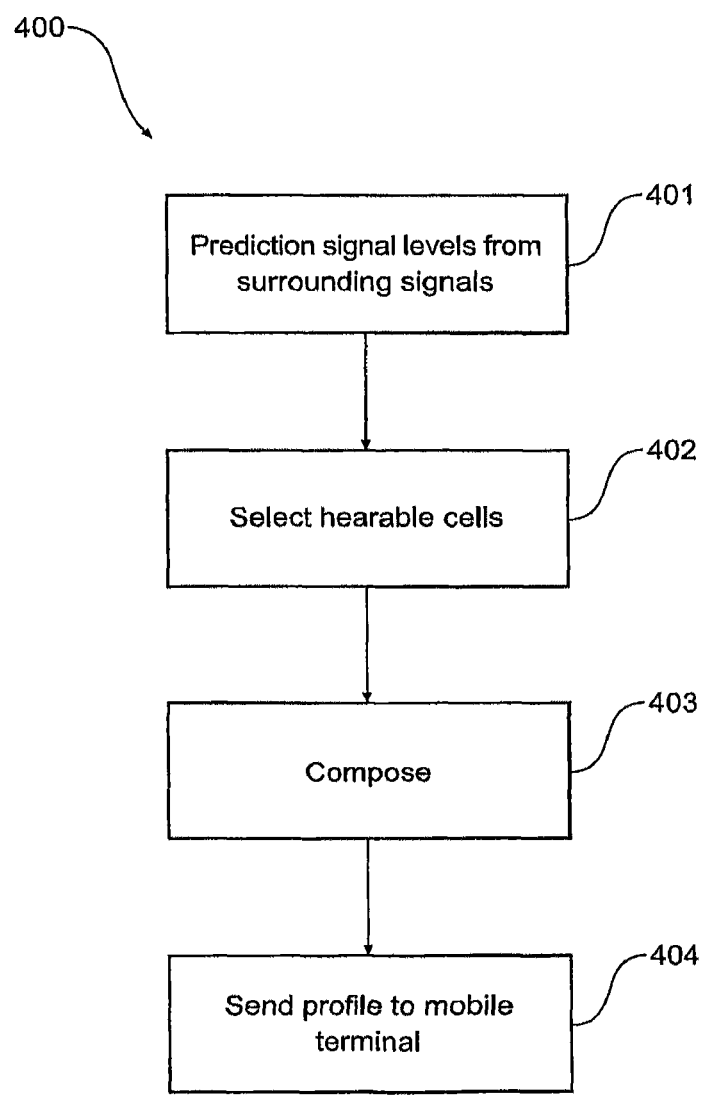
FIG. 12—is a process flow chart of the method used in generating a profile using predictions and refining the profile using measurements.

In yet another embodiment, the profile may be generated in the server using a network propagation model and then relayed to the mobile radio terminal 20 without the refinement phase being initiated. This process is illustrated in FIG. 12 in which process 400 begins with a prediction of signal level cells in step 401, selects hearable cells in step 402, generates the profile in step 403 and then sends the profile to the mobile radio terminal 20 in step 404.

The following illustrates an example of the generation of a profile for the case where cell identity (cell ID) plus radio signal level measurements are used in a GSM network for zone definition and detection. In this case the parameters included in the profile include cell identifiers and received signal levels. A Log-Normal statistical characterization is used in this case for the signal levels as described previously.

During the measurement phase, serving cell and neighbour cell measurements reported by the mobile radio terminal 20 are collected repeatedly. These measurements are used to populate a table containing identifiers for the reported cells and the associated signal level measurements. In one embodiment, repeated signal level measurements for the same cell are averaged and the count incremented. In another form, the successive measurements need not be averaged. In the case of GSM the cell ID may in some cases, only be reported for the serving cell. This may occur, for example, if a SIM toolkit is being used to obtain the measurements. In this case the cell ID field for all cells which are reported only as neighbour cells are identified only by ARFCN and BSIC. The corresponding cell ID fields in the table below are marked as unknown. In this example, the Absolute Radio Frequency Channel Numbers (ARFCN) and Base Station Identity Code (BSIC) for the serving cell are also marked as unknown because the mobile terminal 20 does not report these values for the serving cell.

Table 1 below shows an example table constructed accordingly, over 10 measurement cycles.

TABLE 1

| CellID | ARFCN | BSIC | RxLevMean(dBm) | Count |
|---|---|---|---|---|
| 25068 | Unknown | Unknown | −80.0 | 10 |
| Unknown | 81 | 59 | −88.3 | 10 |
| Unknown | 67 | 46 | −92.1 | 8 |
| Unknown | 71 | 61 | −98.7 | 8 |
| Unknown | 73 | 34 | −101.3 | 7 |

In the present example, the set of measurements is transformed into a profile by completing unknown fields using the network database and/or network parameters and adding additional elements needed by the zone decision process. For example, the unknown cell IDs may be added by searching in the network database for the closest cell to the reported serving cell having this ARFCN and BSIC as described in more detail below when discussing ambiguous measurements. The unknown ARFCN and BSIC for the serving cell are added by looking up these parameters in the network database based on the reported cell ID.

Table 2 below shows the resulting profile. The sigma values are added by the server for use in the zone decision process. In this embodiment, all are set to a default value of 9 (decibels). In practice these might be set to any value between 3 and 20 dB depending on the application and the nature of the environment in which the zone is to be defined. Optionally sigma values in the profile may be set differently for different cells based, for example, on their local environment. In a dense urban area larger values would typically be used, for instance between 9 dB and 15 dB, or between 12 dB and 20 dB or between 14 dB and 25 dB. For less dispersive environments or environments with less clutter smaller values may be suitable, for instance between 3 dB and 9 dB or between 6 dB and 12 dB or between 8 dB and 15 dB. The values may also be varied according to characteristics of the respective cells such as antenna height.

TABLE 2

| CellID | ARFCN | BSIC | RxLevMean | Sigma |
|---|---|---|---|---|
| 25068 | 95 | 38 | −80.0 | 9 |
| 54763 | 81 | 59 | −88.3 | 9 |
| 18322 | 67 | 46 | −92.1 | 9 |
| 892 | 71 | 61 | −98.7 | 9 |
| 18581 | 73 | 34 | −101.3 | 9 |

As previously described above, the processing to derive a zone profile from a set of measurements may be distributed across the system elements in several different ways.

Referring back to FIG. 7, in one embodiment, the measurements are made at the mobile terminal 20 and then relayed to network based server 30 where the profile is generated. In this case the server 30 may utilize a database describing the configuration of the radio network to analyse the measurements and add any missing or additional information.

In another embodiment, the profile generation may be completed at the mobile terminal 20. A limited set of network configuration information may be sent from the server 30 to the mobile terminal 20 for use with the measurements to derive the profile. Using the particular GSM example discussed previously, a list of CellID, ARFCN and BSIC triplets could be sent for the area of interest, enabling the processing at the terminal to fill in the missing details. Similarly variable parameters such as Sigma could also be sent to the mobile terminal 20 for use in generating the profile.

In yet another embodiment, the profile generation may be completed entirely at the mobile terminal 20 without any aid from a network based server 30.

This could be done for instance when all the required information is available at the mobile terminal, for example if the terminal decodes and reports all cell IDs.

In yet a further embodiment, the processing may be done at an element external to the network, as referred to previously in relation to FIG. 8 in which the measurement data is transmitted to an external processor 40, perhaps administered by the provider of a particular location based service or application.

In the case where mobile terminal 20 measurements are used in the zone generation process, the present invention provides some mechanisms for limiting the extent of the zone.

In certain embodiments, the measurements made by the mobile 20 are limited in duration. For example, the system may permit the subscriber to roam around in the desired zone for a limited period as described below, during which measurements are collected. This duration may be sufficient for an apartment or small house. By limiting the duration in this way the user is discouraged from making measurements beyond the approximate intended extent of the zone.

For larger zones, the system can allow the user a larger window of time in which to collect measurements at sample points in the desired zone. The duration may also be varied by the network operator based on different service offerings associated with different sized zones, having different pricing levels or structures. The desired zone sizes may vary depending on the application or service. One way to express the zone size is as a single distance from one size of the zone to the other. For instance in a home zone application, a zone size of between 5 m and 20 m or between 10 m and 30 m or between 20 m and 50 m or any combination of these ranges may be suitable. In this case a time duration between 5 s and 20 s or between 10 s and 30 s or between 20 s and 2 minutes or any combination of these ranges may be sufficient to gather the measurements. In another service targeted to large houses, possibly having multiple stories a larger zone size may be suitable, from 10 m to 35 m or from 25 m to 75 m or from 40 m to 200 m. In this example, suitable measurement time intervals may range from 10 s to 50 s or from 30 s to 3 mins or from 1 min to 5 minutes or any combination of these rages may be suitable. Other zone based services may be targeted at commercial enterprises having offices or other commercial properties. Zone sizes in such cases may range between a few meters and hundreds of meters with corresponding ranges of time required to obtain measurements characterizing the zones.

In some applications, an account representative of the network operator may be responsible for collecting the measurements that define the zone using the mobile radio terminal 20. In this case the system of the present invention provides an alternative mode of operation whereby the account manager has the ability to control the duration of the zone definition measurements. Furthermore, the measurements may also be collected one at a time, at representative points by selecting a menu item to trigger the addition of a new measurement. Depending on the size of the area to be included within the zone between 5 and 20 measurements or between 10 and 50 measurements or between 25 and 100 measurements may be required to adequately characterize the zone. For larger zones perhaps comprising multiple buildings larger numbers of measurements may be needed. For instance between 50 and 250 measurements or between 200 and 1000 measurements or between 500 and 5000 measurements.

In some applications, it may not be necessary to limit the time or the number of measurements made during the zone initialization. In this case, it may be at the user's discretion as to for how long or how many measurements are made. A menu entry may be provided on the terminal for example, to conclude the measurement phase.

For a system where the user is responsible for at least a part of the measurements used in defining the zone, it may be an application requirement to apply checks to ensure that the user has performed the measurements in the area nominated in the service contract. In one aspect, the present invention provides such checks by first applying the measurements to a location system to calculate an estimate of the location from where the user measurements have been made. Examples of appropriate methods of obtaining the approximate location of the mobile radio terminal 20 include those as described in co-pending patent application numbers: PCT/AU2005/001358 entitled "Radio Mobile Unit Location System"; PCT/AU2006/000347 entitled "Enhanced Mobile Location Method and System"; and PCT/AU2006/000348 entitled "Enhanced Mobile Location" The entire contents of each of these applications are hereby incorporated by reference.

The results of this calculation can then be compared against the nominated location of the zone (based for example on a reverse geo-code of the nominated street address) and if the two are within an acceptable distance of each other then the registration process proceeds. What constitutes an acceptable distance may vary from network to network. As an example, a threshold of the order of the average local cell site separation may be suitable.

Otherwise the registration may be rejected or other steps initiated, requiring the user to repeat the registration.

An exemplary algorithm used to determine whether the mobile radio terminal 20 is in the zone or not will now be described. In one embodiment, the algorithm makes a decision as to whether the mobile is in the zone by calculating a cost, and comparing this cost with a threshold. The cost is a quantitative representation of the difference between the measurements and the zone profile, calculated using a cost or penalty function as is well known to those skilled in the art of numerical optimization. The total cost, C, is equal to $$C = C_m + C_{um} + C_{ur}$$

where
$C_m$ = Cost associated with cells that are observed and are matched in the profile
$C_{um}$ = Cost associated with cells that are observed but are not matched in the profile
$C_{ur}$ = Cost associated with cells that are in the profile but are not reported In this example, cells are uniquely renumbered such that cells 1 to $N_m$ are associated with cost $C_m$, cells $N_m+1$ to $N_m+N_{um}$ are associated with cost $C_{um}$, and $N_m+N_{um}+1$ to $N_m+N_{um}+N_{ur}$ are associated with $C_{ur}$, where
$N_m$ = Number of observations that are matched in the profile,
$N_{um}$ = Number of observations that are not matched in the profile,
$N_{ur}$ = Number of cells that are in the profile but are not reported, Each of the costs is then calculated in the following manner:

$$C_m = \sum_{i=1}^{N_m} \frac{(r_{p_i} - r_{o_i})^2}{2\sigma^2}$$

$$C_{um} = \sum_{i=N_m+1}^{N_m+N_{um}} \frac{(r_{p_i} - t_{um})^2}{2\sigma^2}$$

$$C_{ur} = -\sum_{i=N_m+N_{um}+1}^{N_m+N_{um}+N_{ur}} \log\left[\frac{1}{2}\left(1 + \mathrm{erf}\left(\frac{t_{ur} - r_{p_i}}{\sqrt{2}\,\sigma}\right)\right)\right]$$

where
$r_{p_i}$ = The expected value of the signal strength (dBm) of the $i^{th}$ cell, as entered into the profile,
$r_{o_i}$ = The observed value the signal strength (dBm) of the $i^{th}$ cell,
$t_{um}$ = a fixed value (in dBm) that represents the value of signal strength such that it is unlikely that a cell will be not be observed in the profile if the cell's expected signal strength is above $t_{um}$, $t_{ur}$=a fixed threshold (in dBm), as described in PCT/AU2006/000347 entitled "Enhanced Mobile Location Method and System" as referred to above and herein incorporated by reference in its entirety.
σ=scaling parameter, and
erf=the standard error function.

The decision as to whether the mobile is in the zone is made as follows
If $C < \chi^2 (x, N_T-2)$ then in Zone
otherwise, not in Zone.
where
$\chi^2$ is the standard statistical function, $$N_T = N_m + N_{um} + N_{ur}$$

x=a percentage between 0 and 100, which represents the degree of consistency between the measurements and being in the zone.

In a GSM system, experimentation and simulations indicate that suitable values for the unmatched cost threshold lie between −80 dB and −95 dBm or between −85 dBm and −100 dBm or between −90 dBm and −105 dBm. Similarly, suitable values for the percentage, depending on the application lie between 50 and 70 or between 65 and 85 or between 75 and 100 percent.

The value of σ may depend on several factors including the radio environment, and may range from about 3 dB to about 24 dB (e.g. about 3 dB-9 dB, 6 dB-15 dB, 9 dB-20 dB or 13 dB-24 dB). One method of calculating the value of $t_{ur}$ is as described in PCT/AU2006/000347 entitled "Enhanced Mobile Location Method and System" as referred to above and herein incorporated by reference init entirety. In GSM, the signal strengths may be quantized to about 1 dB.

The system may observe the signal levels, timing advance, time differences, or other parameters. In addition, the fact that a particular cell is not reported is also an observation. In the following example, only three types of observations are used: signal levels, timing advance, and unreported cells.

In this case, the cells are assumed to be uniquely renumbered such that cells 1 to $N_m$ are associated with cost $C_m$, cells $N_m+1$ to $N_m+N_{um}$ are associated with cost $C_{um}$, and $N_m+N_{um}+1$ to $N_m+N_{um}+N_{ur}$ are associated with $C_{ur}$, where
$N_m$=Number of observations that are matched in the profile,
$N_{um}$=Number of observations that are not matched in the profile,
$N_{ur}$=Number of cells that are in the profile but are not reported, It should be noted that a variety of approximations may be applied to reduce the computation load associated with these calculations especially in mobile terminals. Examples include a lookup table approximation to the error function and the Chi-Squared distribution.

The following description illustrates the decision process using an example based in a GSM network.

This example uses the profile defining the zone as previously shown in table 2 above. In this example, a new set of measurements are available as illustrated in table 3 below. As before, the ARFCN and BSIC are not available for the serving cell because they are not reported in the NMR data.

TABLE 3

| CellID | ARFCN | BSIC | RxLevMean(dBm) |
|---|---|---|---|
| 25068 | Unknown | Unknown | −67.0 |
| Unknown | 81 | 59 | −83 |
| Unknown | 71 | 61 | −92 |

TABLE 3-continued

| CellID | ARFCN | BSIC | RxLevMean(dBm) |
|---|---|---|---|
| Unknown | 67 | 46 | −99 |
| Unknown | 69 | 43 | −103 |

The total cost is calculated as described above, by summing the costs corresponding to the matched, unmatched and unreported cells. The calculated values for the matched cell costs are shown in Table 4, represented to 2 decimal places.

TABLE 4

| CellID | ARFCN | BSIC | Profile RxLev | Measured RXLev | Cost |
|---|---|---|---|---|---|
| 25068 | 95 | 38 | −80.0 | −67 | 1.04 |
| 54763 | 81 | 59 | −88.3 | −83 | 0.17 |
| 892 | 71 | 61 | −92.1 | −92 | 0.00 |
| 18322 | 67 | 46 | −98.7 | −99 | 0.00 |

The calculated value for the single unmatched cost is shown in Table 5.

TABLE 5

| CellID | ARFCN | BSIC | Measured RxLev | Threshold | Cost |
|---|---|---|---|---|---|
| Unknown | 69 | 43 | −103.3 | −105 | 0.02 |

In this example, since the measurement was not fully populated, using the methods described in PCT/AU2006/000347 (referred to above and herein incorporated by reference in its entirety), an unreported threshold value of −105 is used. The calculated value for the unreported cell cost is shown in Table 6:

TABLE 6

| CellID | ARFCN | BSIC | Profile RxLev | Threshold | Cost |
|---|---|---|---|---|---|
| 18581 | 73 | 34 | −101.3 | −105 | 0.34 |

The sum of the individual costs in this example is 1.57

The cost threshold value is obtained as the 90th percentile from the ChiSq cumulative density function with 6−2=4 degrees of freedom. Using a numerical approximation to this function, rounded to 1 decimal place, the value is 7.8.

Since the calculated cost of 1.57 is less than the threshold value of 7.8, the mobile terminal in this case is deemed to be within the zone.

The following example illustrates the generation of a profile for the case where cell ID plus radio signal level measurements are used in a UMTS network for zone definition and detection. As in the previous example, a series of measurements are taken and accumulated in a table. In each cycle, measurements for the cells in the active and monitored sets are recorded and added to the table. Table 7 below shows an example table constructed in this fashion, over 10 measurement cycles. In this case unlike the GSM example described above, the same cells are reported in each cycle, hence the counts are all equal to 10.

TABLE 7

| CellID | PSC | CPICH RSCP | Count |
|---|---|---|---|
| 53069 | 44 | −65.0 | 10 |
| 53059 | 52 | −69.3 | 10 |
| 52996 | 60 | −73.6 | 10 |
| 52659 | 20 | −77.6 | 10 |

This set of measurements is transformed into a profile by first validating the cell reports against, for example, a database, to identify and address any errors either in the encoding of the measurements or in the network database. A propagation model may then be used to predict the signals that would be detected by a User Equipment (UE) at the location nominated by the user for the zone. In this case, applying a detectability criterion of, for example, Ec/I0>−20 dB, the predicted data indicates that an additional cell is likely to be detected by a mobile terminal as shown below in table 8. In general, this inclusion of additional cells in the profile based on prediction may be done for several reasons. In some cases, the measurements recorded during the initialisation phase may fail to include a nearby cell. This could be by chance, due to the random variations in radio propagation. It could also occur if the cell is in-operative, due to maintenance.

TABLE 8

| CellID | PSC | CPICH RSCP | Count |
|---|---|---|---|
| 39756 | 507 | −76.3 | 10 |

Table 9 below shows the resulting profile. The sigma values are added by the server for use in the zone decision process. In this case, all but one are set to a default value of 9 (decibels). The additional cell added by prediction is assigned a larger sigma because of the greater uncertainty associated with a predicted rather than a measured cell.

TABLE 9

| CellID | PSC | CPICH RSCP | Sigma |
|---|---|---|---|
| 53069 | 44 | −65.0 | 9 |
| 53059 | 52 | −69.3 | 9 |
| 52996 | 60 | −73.6 | 9 |
| 52659 | 20 | −77.6 | 9 |
| 39756 | 507 | −76.3 | 12 |

Figure 13:
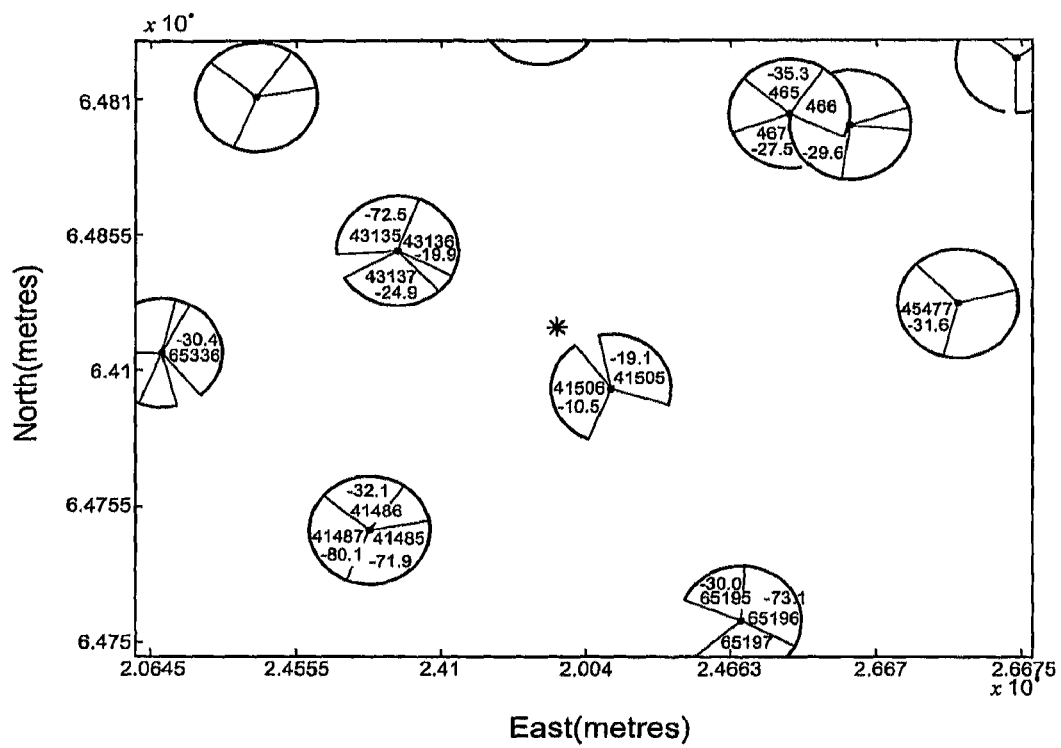
FIG. 13—illustrates an example of the generation of a profile for the case where cell identity (cell ID) plus other radio signal level measurements are used in a UMTS network.

FIG. 13 illustrates an example of the generation of a profile for the case where cell identity (cell ID) plus other radio signal level measurements are used in a UMTS network. The zone definition which is expressed in terms of radio parameters is generated using a modeling tool based on a zone location specified in geographic terms. The location is specified in terms of easting and northing and corresponds to the point marked with an asterisk in the centre of FIG. 13. The modeling tool is used to predict the CPICH RSCP as well as CPICH Ec/I0 for each cell in the area at the specified location. From these predictions, the Ec/I0 threshold is applied to select the cells to be included in the profile. For this example, cells 4150, 41505 and 43136 shown in FIG. 13 are selected. The predicted CPICH RSCP values for these cells are then used to create the zone profile which is shown below in table 10.

TABLE 10

| CellID | PSC | Mean CPICH RSCP | Sigma |
|---|---|---|---|
| 41506 | 62 | −72.9 | 12 |
| 41505 | 50 | −81.2 | 12 |
| 43136 | 40 | −81.9 | 12 |

The preceding example illustrates the use of cell IDs and signal level measurements only. Other measurements may also be utilized such as timing measurements. In UMTS for instance, Round Trip Time (RTT) measurements for the cells in the active set may be utilised. In this case, reference measurements may be taken during the initialization phase. For each cell and parameter, an entry is then added to the zone profile representing a typical value for this parameter along with a value representing the expected statistical variation of this parameter within the zone. When evaluating a set of measurements against this profile, a cost is computed as illustrated for power levels above wherein the difference between the measured value of the parameter and the value in the profile is calculated and scaled by the statistical scaling parameter to obtain a cost for combining with the costs associated with the other measurements. In similar fashion other radio parameter measurements may be incorporated in the process such as time differences. Indeed any radio parameter measurement for which a typical value and a measure of its variation within the zone can be obtained may be used in similar fashion as will be understood by one skilled in the art.

In some cases, the radio parameter measurements may not include a cell identifier. This may be for instance due to a limitation of a mobile terminal or a characteristic of the radio network. In such cases alternative identification parameters may be used, such as a Location Area Code (LAC) in the GSM network or a combination of channel frequency and other parameter such as a scrambling code.

This example uses cell IDs and signal level measurements only. An alternative would be to also incorporate Round Trip Time (RTT) measurements for the cells in the active set.

In certain embodiments, Base Station Identification (BASE_ID) and Pilot Power (Ec/I0) can be used in a CDMA (IS95) network for example, for zone definition and detection. As with the GSM and UMTS examples a series of measurements may be recorded from within the zone. The measurements may correspond to any combination of the members of the active set, the candidate set, the neighbouring set and the remaining set of cells maintained by the mobile terminal. As would be understood by a person of ordinary skill in the art, In a CDMA network, the mobile terminal divides searching into three windows, SEARCH_WIN_A, SEARCH_WIN_N and SEARCH_WIN_R to gather information to support the handover process. In these windows, the mobile terminal gathers information about these four types of cells which collectively include all cells in the network.

Much like in the previous exemplary embodiments, appropriate modifications can be made to the data if necessary (e.g. errors can be resolved, cells can be added or removed based on selected Ec/I0 criteria etc.) and the data can be compared to a propagation model to detect if the mobile terminal was situated approximately within the zone when the measurements were recorded.

As would be understood by a person with ordinary skill in the art, additional or other information can also be used in a CDMA network for zone definition and detection. This may include pilot channel received power levels and measured PN offsets.

When using measurements relating to more than one cell for zone definition and detection, in some cases a situation arises where one or more of the measurements is ambiguous. The term 'ambiguous' will be understood to mean that the parameter measurement by itself could be associated with multiple cells in the radio network and it is not possible from the measurement itself to identify which cell was measured. In many cases, to generate a useful zone profile, it is necessary to resolve the ambiguity. A suitable means for performing this is illustrated below. In other cases it may be possible to derive a suitable profile without resolving the ambiguous measurements. One example where this is feasible is where no check is required as to the actual location from whence the measurements were made.

Figure 14:
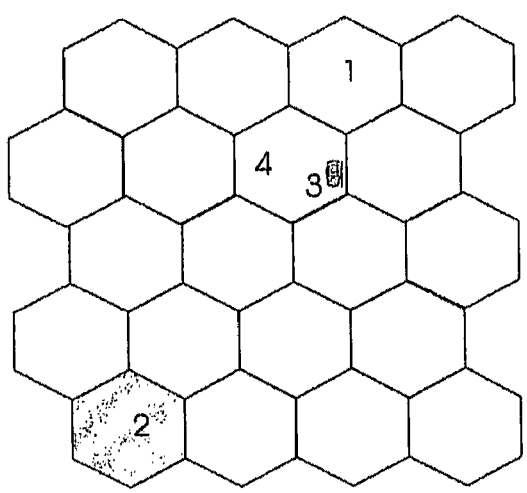
FIG. 14—illustrates an example in a GSM network in which the system uses some measurements taken within the zone in the profile generation process.

FIG. 14 illustrates an example in a GSM network in which the system uses some measurements taken within the zone in the profile generation process. Mobile network 10 is shown using an idealized hexagonal representation for the area served by each cell. Mobile radio terminal 20 is served by the cell 4. Two other cells 1 and 2 (shaded) are also shown. These cells share the same ARFCN and BSIC and therefore if reported by a mobile terminal as neighbour measurements will yield ambiguous measurements in the sense that it is not possible without using additional information such as the cell ID for the serving cell to determine which of these two cells was actually measured.

During the measurement process, the mobile radio terminal 20 reports a power level measurement for a neighbour cell 1. The measurement consists of the ARFCN, the BSIC and the RxLev for the cell. However, the particular ARFCN and BSIC values reported are shared by more than one cell in this network (1 and 2). To fill in the cell ID in the profile, it is necessary to resolve the ambiguity and identify which of the cells having this value of ARFCN and BSIC was actually measured by the mobile terminal.

One way to achieve this resolution is to identify all the candidate cells using this ARFCN and BSIC and then select the one which is closest to the point nominated by the subscriber for the zone address. An alternative method is to use a modeling tool and calculate the likely signal level received from all the candidate cells at the zone. In this case, the one with the strongest predicted level would be identified as the cell that was reported by the subscriber's terminal. Instead of using a location corresponding to the zone, other approximate locations could be used. Some methods of obtaining such an approximate location of mobile radio terminal 20 within network 10 are described in co-pending PCT patent application numbers: PCT/AU2005/001358 entitled "Radio Mobile Unit Location System"; PCT/AU2006/000347 entitled "Enhanced Mobile Location Method and System"; and PCT/AU2006/000348 entitled "Enhanced Mobile Location". The entire contents of each of these applications are hereby incorporated by reference. In this case, the resolution process attempts to identify the candidate most likely to have been measured contemporaneously with the particular serving cell.

The issue of ambiguous measurements arises again during the zone detection process where a set of current measurements is compared against a zone profile. Again referring to FIG. 14, in the case where mobile radio terminal 20 is situated within the zone and reports a neighbour measurement for the neighbour cell 1. As previously described, this measurement is in itself ambiguous. Although the ARFCN and BSIC reported match the ARFCN and BSIC of an entry in the zone profile, without knowing where the mobile radio terminal 20 is situated, it is not clear whether there is a match against the cell in the profile. It is only known that the measured parameters match some fields of an entry in the profile. In this case the present invention does not require an explicit ambiguity resolution of the kind that may be required when generating the profile. Instead, using at least one unambiguous match, reliance can be placed on the unambiguous match to constrain the location of the mobile radio terminal 20, sufficiently such that there can only be one candidate cell in that vicinity whose parameters match the entry in the profile. For example, if the current measurements include a serving cell report for cell 4, then it is known that of the ambiguous cell candidates whose ARFCN and BSIC match the reported parameters, only cell 1 could be measured in this area and therefore it must be a match against the entry in the profile.

While the present example shows the use of a cell ID to resolve the ambiguity, it will be understood that other methods are available. In GSM, for example, using the Location Area Code (LAC) rather than the cell ID would in many cases also enable the ambiguity to be resolved. Yet another possibility is to use the provisioning information to resolve the ambiguity for the zone definition measurements. In this case, a series of ambiguous measurements could be collected and the nominal location supplied by the user used to constrain the location of the mobile terminal and thereby enable the ambiguity to be resolved. In other networks, similar parameters can be used to resolve the ambiguity. In UMTS, the similar assignment of cell ID and LAC enables a similar mechanism as described for GSM.

Figure 15:
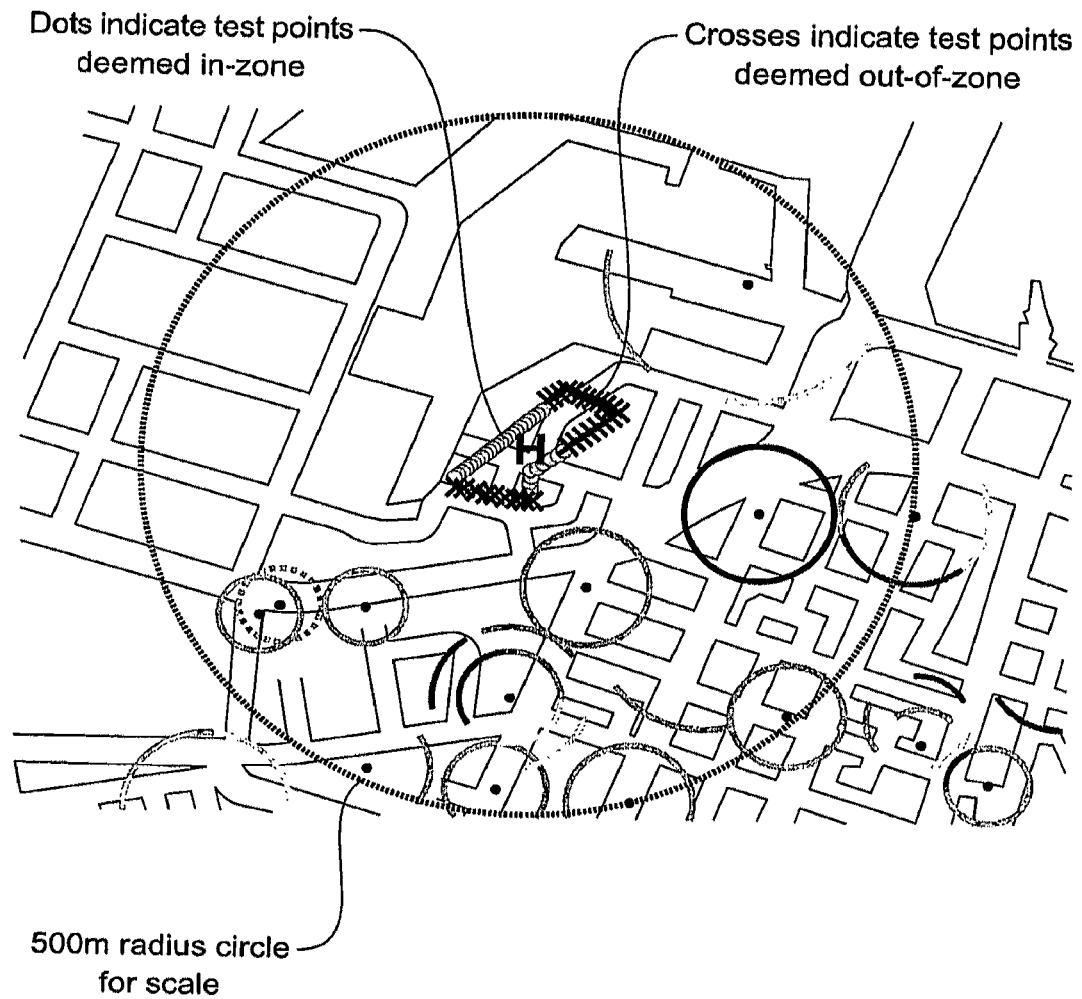
FIG. 15—shows an example of a zone defined in a GSM network in an urban location characterized by high cell density.

FIG. 15 shows an example of a zone defined in a GSM network in an urban location characterized by high cell density with cell site separations ranging between 100 meters and 1 km. The desired zone was defined in a small coffee shop. The location of the coffee shop is marked with an H. A series of test points are also marked on the map around the zone using either a dot or a cross. Dots mark those test points where the system returned an IN-ZONE indication while crosses represent points that were determined by the system to be OUT-OF-ZONE. The in-zone reliability in this case was measured to be greater than 90 percent over a period of slightly less than 1 hour. The attendant leakage area in this example has a radius of a few tens of meters. A circle of radius 500 meters is shown centred on the desired zone to provide an indication of scale.

The specific reliability and zone size shown here should not be interpreted as a limit on the operation of the present invention. With different parameter settings, reliabilities greater than about 75 percent or greater than about 85 percent or greater than about 90 percent or greater than about 94 percent or greater than about 97 percent could be achieved. Similarly zone sizes between 5 meters and 30 m or between 20 m and 200 m, or between 100 m and 3000 m could be achieved.

Another way to represent the detection performance is as a curve of in-zone status versus range from the notional centre of the zone. The vertical axis represents the proportion of time (or proportion of measurement cycles) in which the system returns an in-zone indication. Ideally the curve should start at 100 percent inside the zone and then drop as quickly as possible to 0 percent at some range from the zone.

Figure 16:
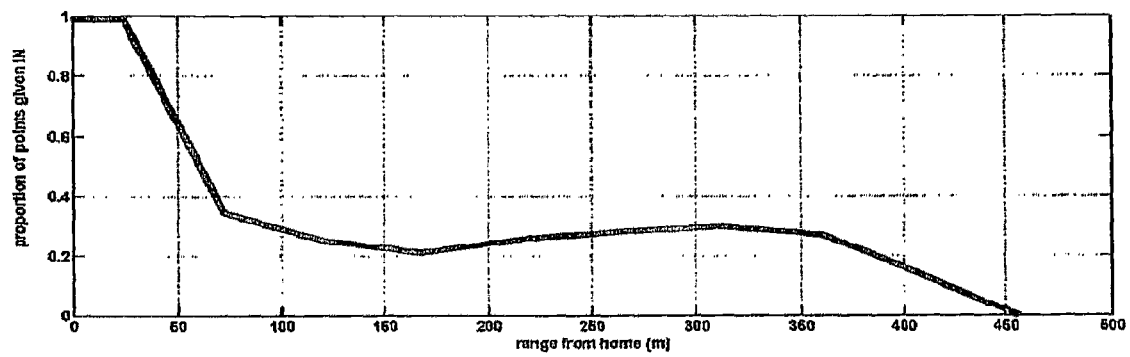
FIG. 16—is a plot showing the results of tests on a GSM network in a rural environment upon application of one aspect of the present invention.

FIG. 16 illustrates this type of representation to show the results of tests on a GSM network in a rural environment. Separation between nearby cell sites ranged between 6 and 10 kilometers. The desired zone was defined as the interior of a small farm dwelling. In this case, the reliability within the zone exceeded 99 percent as shown by the curve at the left-most extreme of the plot. Outside the zone, the proportion of points reported as IN-ZONE decays with increasing range from the zone, reaching zero at about 460 meters meaning that for this test, any point greater than 460 meters from the dwelling was deemed to be out of zone. The fact that the curve does not decay monotonically to zero with increasing range is due in part to the fact that the test points were distributed in all directions around the zone. As will be understood by the person skilled in the art, the vagaries of radio propagation mean that zone extents will seldom be smooth or symmetric about the centre of the zone. In this illustration, folding a 2-dimensional set of measurements around the zone onto a single axis representing range from the zone causes the asymmetry in the zone extent to produce a rise between 200 m and 350 m in FIG. 16.

In this experiment, the extent of the desired zone was of the order of 20 meters across. From the curve in FIG. 16, it can be seen that this corresponds to the region of close to 100 percent reliability. Ranges from 20 meters to 460 meters correspond to the transition zone or leakage area, while beyond ranges of 460 meters correspond to out-of-zone. These values were observed with a particular setting of the system parameters. With other settings, reliabilities of greater than about 75 percent or greater than about 85 percent or greater than about 90 percent, or greater than about 94 percent or greater than about 97 percent could be achieved. Similarly zone sizes between 200 meters and 800 m or between 500 m and 1500 m, or between 800 m and 4000 m could be achieved.

An advantage of one aspect of the present invention is the ability to adjust the zone determination to directly control the trade-off between in-zone reliability and leakage to trade off the in-given-out error rate against the out-given-in error rate. In different applications, an operator of the system will place a different importance upon Out-Given-In errors and In-Given-Out errors. For example, in zone based charging application, users will demand a very low probability of In-Given-Out errors. In contrast, in a geo-fencing application concerned with determining if a high value item had been removed from a zone by monitoring a mobile terminal attached to the item, the most serious error will occur if the item is removed and the theft is not detected. This is an Out-Given-In error. In such cases, the operator might accept a higher probability of an In-Given-Out error, in return for a lower probability of a Out-Given-In error.

Figure 17:
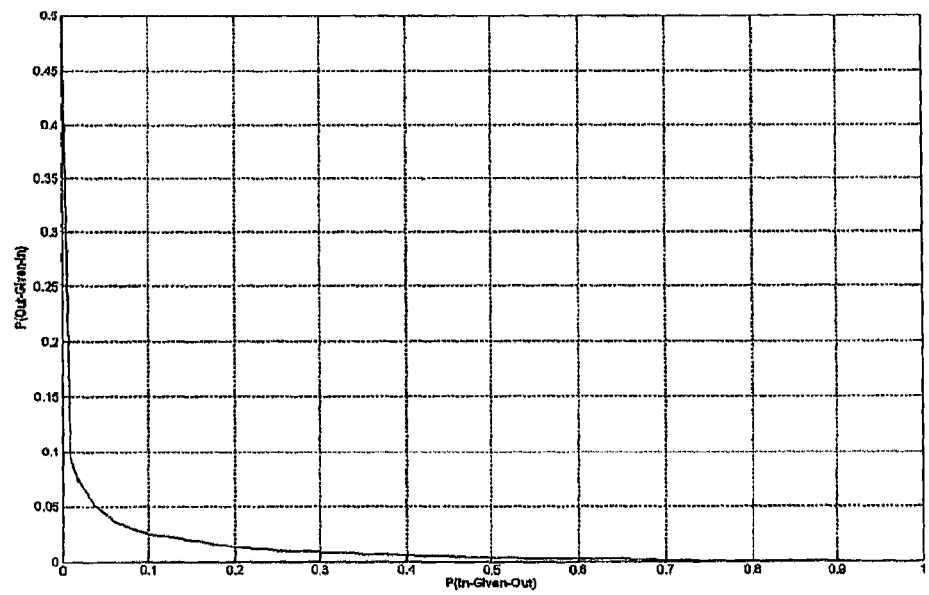
FIG. 17—shows a plot of a system Operating Curve showing the relationship between Out-Given-In error and In-Given-Out error.

This aspect of the present invention provides a means to achieve a trade-off between the two types of errors. This can be done by changing the threshold between about 0 and about 100%. Each value of the threshold determines a different value for the probability of an Out-Given-In error and an In-Given-Out error. This generates a smooth Operating Curve for the system. An example of this Operating Curve is seen in FIG. 17. As can be seen, there is considerable flexibility in choosing the different values of the errors, but a trade-off between the two is involved, as embodied in the Operating Curve of FIG. 17. It will be appreciated that changing the threshold also alters the size of the transition zone, with the zone size increasing with increasing probability of In-Given-Out errors.

Figure 18:
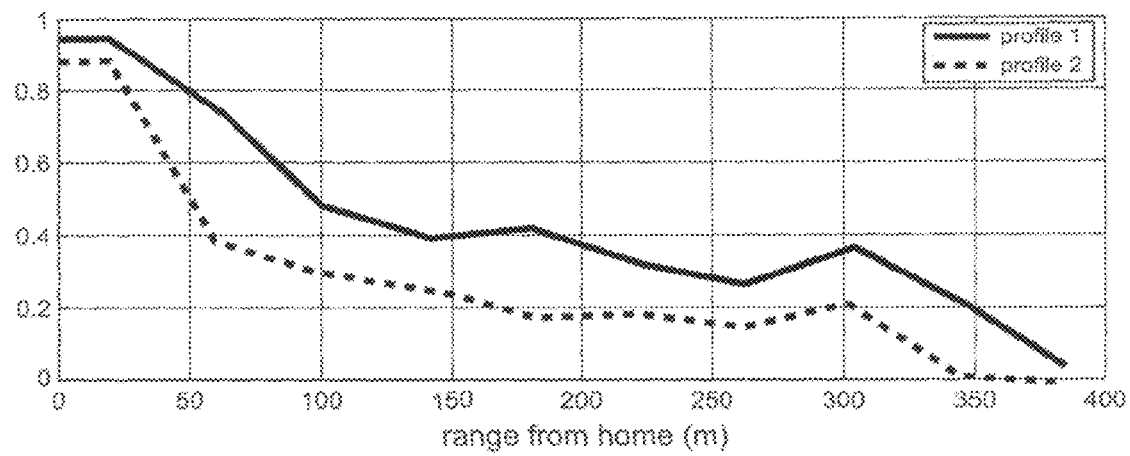
FIG. 18—is a plot showing the results of trials in a GSM network in a low density urban area and showing the effects of varying the relationship between Out-Given-In error and In-Given-Out error.

FIG. 18 illustrates the effect of this type of adjustment with real world data. It shows the results of trials in a GSM network in what might be described as a low density urban area. In this case the desired zone was of the order of 35 meters diameter in size. For this trial, two separate zone definitions were utilised, both derived from a single set of initialisation measurements. For the second zone definition, the decision threshold as described earlier was tightened by a small amount with the aim of reducing the in zone reliability by approximately 10 percent in order to achieve a smaller leakage area. In this case, the solid line shows the performance of the first zone definition while the dashed line shows the performance using the second zone definition.

These curves show that the in-zone reliability with the second definition was reduced by approximately 6 percent. The effect of the tightened zone definition on the leakage area or transition region (measured here as a linear distance rather than an area) is a reduction of approximately 50 meters. This shows that the present invention provides fine control over the zone performance parameters allowing service providers to optimise zone definitions to suit their applications. In the case of a home zone application, this means that they are able to achieve a good balance between customer satisfaction and leakage area.

This aspect of the invention will now also be described from a different perspective, with reference to FIGS. 19 to 22.

Figure 19:
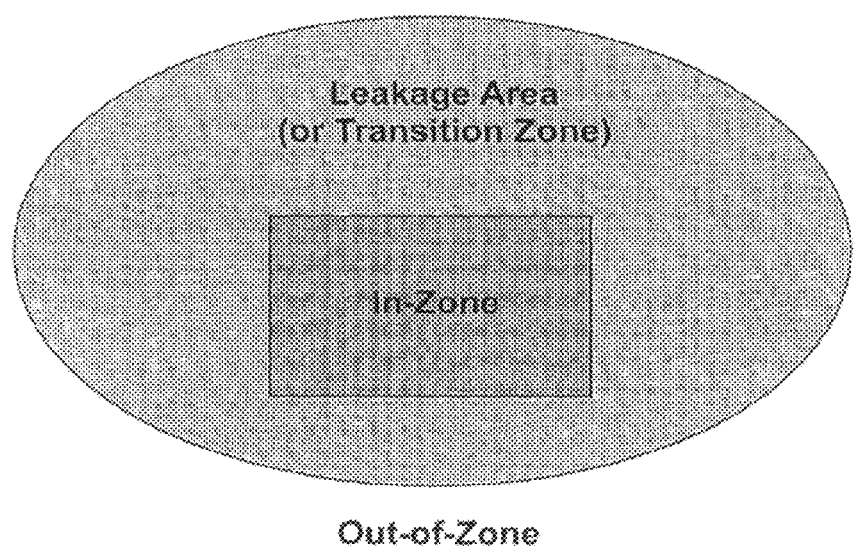
FIG. 19—is an illustration of the distinct regions that can be identified with a zone detection system.

FIG. 19 shows a schematic representation of the elements of a zone and zone boundary. The region bounded by the rectangle represents the desired or ideal zone boundary. This might in one example be the extent of a subscriber's home, office, relative's home or friend's home etc. In other applications this might be the extent of a commercial premises, a school, park or even a portion or entire area of a hotel. In some cases, the extent may be defined in three dimensions, including horizontal limits as well as vertical limits, constraining the extent to one or more stories of a multi-story building. It should be noted that the ability to limit zone extents in the vertical dimension in general is provided by an aspect of the present invention. In zone definition systems with less spatial discrimination, unless separate stories in buildings are served with a dedicated cell having only limited local coverage it is not possible to achieve vertical discrimination while maintaining high levels of in-zone reliability. The desired zone is the region within which the system should determine that the mobile terminal is in the zone. Because the radio signal parameters do not change sharply at the border of the desired zone, in practice the actual zone will include some area outside the desired zone within the actual zone or measured zone. Beyond this, is the Out-of-Zone area. In this area the system almost always deems the mobile terminal to be out of zone. The region between the desired zone and the out-of-zone areas is referred to as the transition zone.

In describing zone sizes, it will be appreciated that, where the shape of the zone may not always be a smooth, symmetrical or contiguous area, it is convenient to use a single value representing the maximum range from the centre of the zone to any point included within it. Since there may be random variations at particular points, it is generally useful to include a statistical element to this definition. For zone leakage, one suitable definition for the present purposes is whether in 100 random tests at a point an in-zone indication would be returned in more than 1 test. Typical sizes for the desired zone may range from about 5 meters to about 2500 meters (for example about 5-10 m, about 5-25 m, about 5-50 m, about 10-100 m about 25-2000 m, about 50-2500 m, about 100-2500 m, about 500-2500 m etc.).

For zones that include a vertical dimension (limited stories in a multi-story building for example) the zone sizes may range between about 1 meter and about 250 meters (for example about 1-3 m, about 1-5 m, about 2-10 m, about 3-25 m, about 5-35 m, about 10-100 m, about 25-250 m, about 50-250 m etc.).

Typical leakage areas may range between about 20 and about 5000 m (for example about 20-50 m, about 20-100 m, about 20-250 m, about 20-500 m, about 20-1000 m, about 100-1000 m, about 100-2000 m, about 500-2500 m, about 500-3500 m, about 500-5000 m, about 1000-5000 m, about 2000-5000 m, etc.).

Due to the random variations in mobile propagation, in this transition zone, the zone decision is likely to vary randomly between in and out of zone decisions. From a commercial viewpoint this transition zone is often referred to as leakage area. This is because typically, the desired zone is associated with a reduced tariff or preferential quality of service. The fact that this service is also available to some extent in the transition zone represents a commercial cost or revenue leakage.

"In zone reliability" is the degree to which, when the mobile radio terminal is in the desired zone, the system correctly returns an in-zone indication. Typically the requirement is for this reliability to be very high because it is the foremost aspect of the subscriber's experience and any perceived deficiency in the reliability is unlikely to be tolerated. As an example, a typical requirement may be about 99% or greater. This means that in 99 out of 100 experiments or better, when the mobile terminal is within the desired zone, the system should return an in-zone indication. The evaluation may be measured as a percentage of points randomly selected within the zone or alternatively as a proportion of time.

In other applications, the in zone reliability may be required to be about 80%, about 90%, about 95%, about 97%, about 99.5% or other values as would be applicable to a particular application.

The second term is the leakage, already referred to above. In one case this represents the area outside the desired zone, where the system deems the mobile radio terminal to be within the zone. In applications where subscribers are being offered a preferential quality or service or a reduced tariff, this leakage area outside the desired zone represents a cost that must be minimised. In some cases the leakage area may have a temporal component to it. If for instance the system is operated in a manner in which the zone decision is only refreshed every hour, a subscriber could leave the zone immediately following one evaluation and for the remainder of that hour be treated as in-zone when in fact out-of-zone.

The interplay between the in zone reliability and the leakage may require a compromise. In many applications the in zone reliability is an important requirement. The zone definition must therefore be configured to provide this level of reliability. The resulting leakage is an attendant cost that must be borne. As described above, it is an advantage of this aspect of the present invention that for a specified in-zone reliability, the corresponding leakage can be made smaller than through existing techniques. Alternatively, if the application requirements dictate that the leakage area must be constrained to less than some value, the extent can be constrained, with an attendant reduction in the in-zone reliability.

It is a further advantage of this aspect of the present invention that the tradeoff between reliability and leakage can be adjusted with fine granularity. This feature is now illustrated, by contrasting the present system with a system using cell IDs only.

Figure 20:
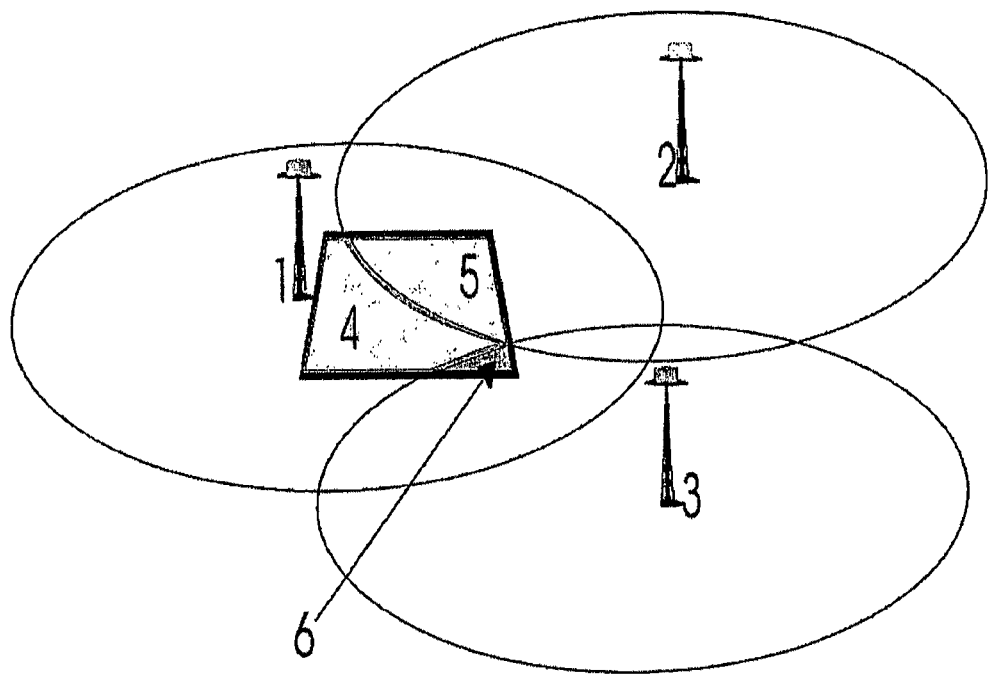
FIG. 20—shows a zone defined within a Cell ID system.

FIG. 20 illustrates a cellular network comprised of 3 cells labeled 1, 2 & 3. As with all practical cellular networks, the coverage areas for each cell overlap to a degree. In this case a subscriber registers for a zone whose extent is shown in perspective view by a rectangle. In this rectangle, the subscriber's mobile terminal may be served by any one of cells 1, 2 or 3. As can be seen from the illustration, the majority of the coverage areas of cells 1, 2 & 3 constitute leakage area. The fractions of the zone covered or served by each of the cells are shown by different strengths of shading. Cell 1 covers the major proportion of the desired zone (approximately 60 percent in this example). Cell 2 covers virtually all the remaining area (approximately 35 percent in this example). Cell 3 contributes only a small amount of coverage in the zone (approximately 5 percent in this example).

The lack of precision in trading off reliability versus leakage can be seen from the fact that if the zone were to be defined as those areas where the mobile radio terminal selects either cell 1 or cell 2 as its serving cell, then in this example, a coverage, or in-zone reliability of about 95 percent is achieved. The leakage in this case is the total remaining area also served by these two cells.

Figure 21:
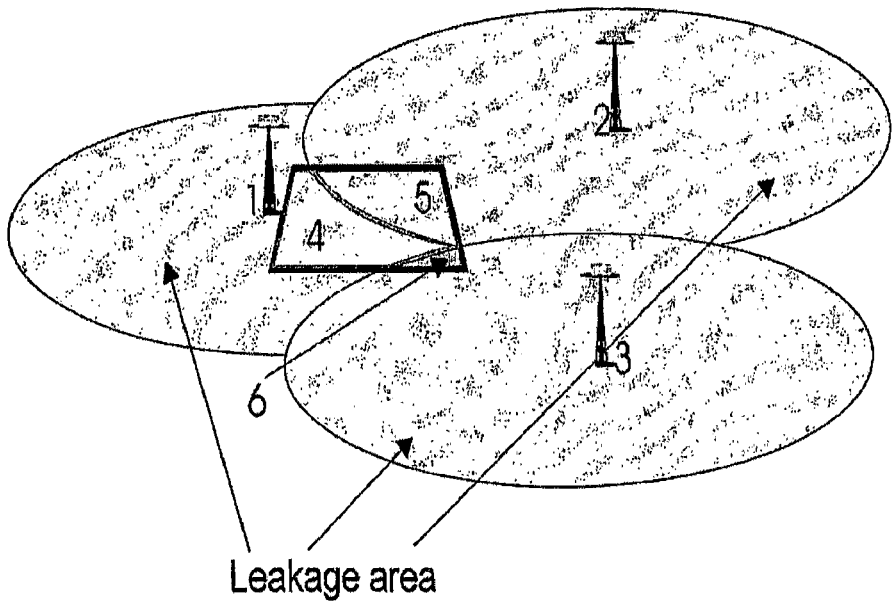
FIG. 21—shows the resulting extent of the zone of FIG. 16 when attempting to increase the in-zone reliability.

In order to increase the in zone reliability to about 99 percent or greater however, it is necessary to add cell 3 into the zone definition. This only achieves a gain of a few percent in the zone reliability, but at the very great cost of increasing the leakage area by between 30 and 40 percent. The resulting extent of the actual zone is illustrated in FIG. 21, in which the shaded regions indicate the extent of the zone.

Figure 22:
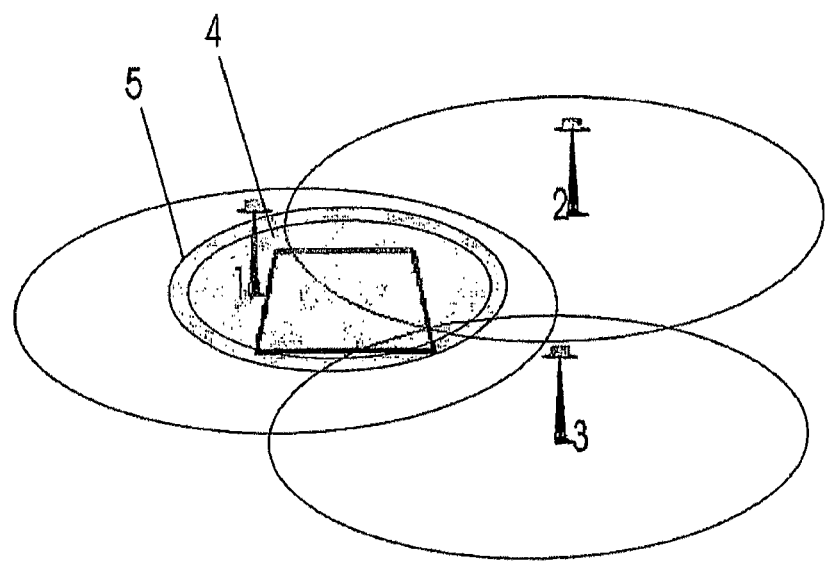
FIG. 22—shows the resulting extent of the zone of FIG. 17 when increasing the in-zone reliability using an aspect of the present invention.

FIG. 22 illustrates the same network with the same desired zone, using the present invention to provide the zone definition and detection. The darker shaded region 4 represents a zone definition achieved with a certain set of radio parameters. In this case, as with the previous example, only a small fraction of the desired zone in the lower right corner of the zone is outside the effective zone as operated by the system.

An in-zone reliability requirement of greater than or about 99 percent is assumed once again. As a result it is necessary to adjust the zone definition to cover at least 99 percent of the desired zone. In this case rather than having to add the entire coverage area for another cell into the zone definition, the decision threshold is relaxed (as described in the discussion above with reference to an application of the algorithm) by a small amount. This yields the modified zone extent represented by the lightly shaded ellipse 5. The increased zone reliability in this case is achieved at the cost of a small increase in the leakage area. The present example also illustrates another feature of some embodiments of the present invention, namely that the extent of the zone need not have any fixed dependence on the location and/or orientation of the radio network cell sites and/or cell sectors. This is in contrast to systems in which the zone is defined in units of cell coverage areas, optionally including a round trip timing measurement; in these cases, the zone must either enclose one or more of the cell sites or else lie in some fixed relationship such as when a round trip delay measurement is used to constrain the extent to a sector or a sector of an annulus.

Figure 23:
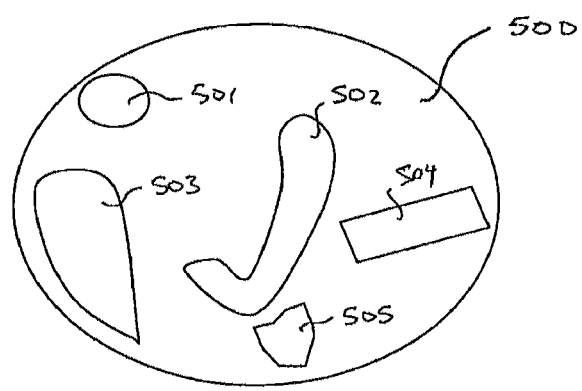
FIG. 23—illustrates some of the possible zone shapes and locations within a cell.

FIG. 23 shows a representation of a cell 500, within a radio communications network, in which are defined a number of regions or zones 501, 502, 503, 504 and 505, in a completely controlled manner. As can be seen, the size, shape, position and orientation of these zones is completely independent of the cell 500 within which they are defined.

Figure 24:
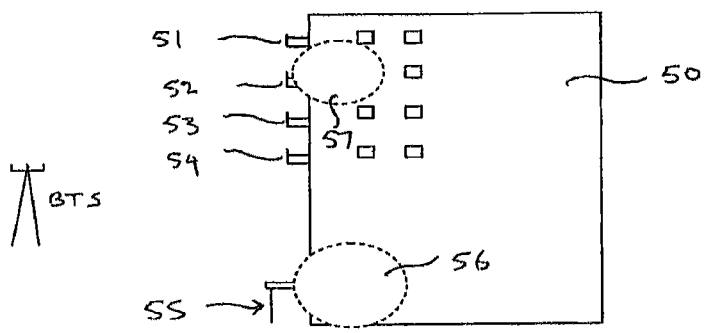
FIG. 24—illustrates zones defined in the vertical dimension in a building.

As previously described, this feature may also be extended in the third dimension, enabling systems utilising this aspect of the present invention to define zones in a vertical orientation as well as horizontal one. FIG. 24 illustrates an apartment building 50 having multiple floors, including floors 51, 52, 53 and 54, as well as a lobby 55. In accordance with this aspect of the invention, tightly controlled zones 57 and 55 are able to be provided. This allows individual floors or level and individual apartments to be individually-zoned to provide location-based services to those living in high-density, multi-level areas.

In the example in FIG. 24, the occupant of the apartment on the level indicated 52 is able to enter into a service contract to provide him with a "home zone" billing arrangement, whereby any calls made from his apartment may be billed at a lower rate than outside the apartment.

Similarly, the apartment owners may enter into a service agreement with the communications service provider that any guests or building occupants making a call from the lobby of the building are charged at a differential rate. This may be the same as, or different to the rate charged to the occupant of the home zone arrangement.

Similarly, it will be appreciated that the zones 56 and 57 may in fact overlap, as discussed above with reference to FIGS. 2 to 4. In this example, the building owners may have entered into a service arrangement such that the entire building is provided with a differential call rate, by having zone 56 extend to cover the entire building. At the same time, the occupant of the apartment may further enter into his own service contract whereby calls made within the apartment covered by zone 57 (which is within the volume defined by zone 56), will be charged at a different rate.

Of course any other applications or services that can be location or zone-based may be equally applicable.

The achievable zone detection performance in real world radio networks depends on a number of factors. Below are described some of these factors including examples of performance of the present invention measured in real networks using standard mobile terminals.

The zone detection problem can be conceived of in similar terms to detecting a signal obscured in random noise. The signal of interest in this case is the difference between current radio parameter measurements and the typical radio parameter measurements in the desired zone. Larger differences indicate a greater likelihood of being out of the zone.

In an ideal world, absent of radio channel factors such as fast and slow fading, interference, noise and mobile terminal measurement errors, for a small zone, the radio signal parameters measured across the zone would be relatively consistent. As the mobile radio terminal 20 is moved out of the zone to increasing ranges, the radio parameter measurements would change smoothly, enabling a threshold to be set confidently, marking the limit of the zone. When the difference between the reference parameter measurements in the zone and the current measurements reached this threshold, the mobile could be accurately deemed to be away, or out of zone.

In practical radio networks, the presence of the radio channel phenomena described above contributes much of what can be considered as noise in the detection problem. The achievable performance therefore can also be understood as a function of the signal to noise ratio. If the difference in radio parameter measurements between the desired zone and elsewhere is small but the noise factors produce large fluctuations in the parameter measurements then the achievable performance may be limited.

As described previously, two performance characteristic are in-zone reliability and leakage. These two characteristics may be combined into single term-spatial discrimination. A superior zone detection system is one that exhibits greater spatial discrimination, being able to detect more accurately the difference between when mobile radio terminal 20 is in and when it is out of a particular zone.

The achievable spatial discrimination is in part dependent upon the type of information used. For a simple cell ID based system, cell size may be an important function of the size of the coverage area of the individual cells. In the present invention, where in one aspect, signal level measurements are also incorporated in the zone detection processing, the cell dimension is still a factor. In areas where the cell density is relatively high (for example a few hundred meters apart or less. The spatial discrimination can be very precise—of the order of a few tens of meters. In contrast, in rural areas where the cells may be separated by many kilometers, the spatial discrimination that is achievable using signal level measurements may be reduced. In such cases practically achievable zone sizes may be a few hundreds of meters in size. When the present invention is applied using timing measurements (optionally in addition to signal level measurements), the effects of increasing cell dimension are substantially reduced.

Another factor affecting the achievable performance is the number of measurements available. For example a system utilizing serving cell identifiers plus radio signal level measurements will on average exhibit greater spatial discrimination when presented with larger numbers of signal level measurements. The number of measurements available is in turn affected by a number of factors. One such factor is the cell density and network planning. If more cell sites are within detectable range of the zone, a mobile terminal will generally be able to report a greater number of signal level measurements. Network planning also has an effect because an inferior network plan can result in greater levels of interference observed by the mobile and a corresponding reduction in its ability to measure weaker signals.

Another factor that affects the achievable spatial discrimination is the size of the desired zone. Generally, a larger desired zone exhibiting the same in-zone reliability as a smaller desired zone in the same location will have a greater leakage area. A zone having a greater in-zone area (desired zone) will exhibit a less sharp transition from this zone to the out-of-zone region.

In an Urban area, where cell site separation is relatively small, the performance of the present invention allows zone definitions as small as about 1-250 m (e.g. about 1-10 m, about 15-35 m, about 50-75 m, about 50-100 m, about 200-250 m, about 5 m, about 15 m, about 27 m, about 60 m, about 85 m, about 125 m, about 150 m, about 200 m about 225 m etc.) while maintaining a target in zone reliability of between about 70-100% (e.g. about 70-80%, about 75-95%, about 80-99%, about 85-99.5%, about 90-99%, about 90-95%, about 92-98%, more than about 85%, 90%, 93%, 95%, 99%, 99.5% etc.).

Similarly in suburban areas, where cell site separation is greater than in urban areas, the performance of the present invention allows zone definitions as small as about 50-800 m (e.g. about 50-100 m, about 50-200 m, about 100-400 m, about 250-500 m, about 250-700 m, about 300-800 m, about 400-800 m, about 50 m, about 70 m, about 100 m, about 150 m, about 225 m, about 320 m, about 380 m, about 450 m about 575 m, about 700 m, about 780 m etc.) while maintaining a target in zone reliability of between about 70-100% (e.g. about 70-80%, about 75-95%, about 80-99%, about 85-99.5%, about 90-99%, about 90-95%, about 92-98%, more than about 85%, 90%, 93%, 95%, 99%, 99.5% etc.).

Similarly in rural areas, where cell site separation is greater than in urban and suburban areas, the performance of the present invention allows zone definitions as small as about 100-2500 m (e.g. about 100-300 m, about 100-450 m, about 150-600 m, about 250-650 m, about 300-1500 m, about 600-2250 m, about 800-2250 m, about 1200-2500 m, about 1800-2500 m, about 100 m, about 220 m, about 320 m, about 450 m, about 560 m, about 800 m, about 1220 m about 1600 m, about 2100 m, about 2400 m etc.) while maintaining a target in zone reliability of between about 70-100% (e.g. about 70-80%, about 75-95%, about 80-99%, about 85-99.5%, about 90-99%, about 90-95%, about 92-98%, more than about 85%, 90%, 93%, 95%, 99%, 99.5% etc.).

In embodiments of the present invention, the zone definitions and target in-zone reliabilities can be continually adjusted in absolute terms or by relative percentages. For example the zone sizes can be adjusted from about 0% to about +/−500% (e.g. about 0-2%, about 10-25%, about 20-50%, about 25-90%, about 50-250%, about 100-350%, about 150-500%, about −500%-−150%, about −350%-−100%, about −250%-−50%, about −90%-−25%, about −50%-−20%, about −25%-10%, about −2%-0%, about +/−400%, about +/−350%, about +/−280%, about +/−140%, about +/−120%, about +/−80%, about +/−40%, about +/−20%, about +/−12%, about +/−8%, about +/−5%, about +/−2% etc.).

The following tables provide some exemplary values for the achievable performance in different networks and conditions. It will be understood that these are exemplary figures, based on a significant number of tests carried out in networks in several countries, in a variety of environments with different desired zone sizes.

In these tests, the following assumptions are made:
the desired zone is a single story building with an extent not exceeding 25 m×25 m
the target in-zone reliability is 99%
the leakage size is measured as the radius of a circle centered on the desired zone which includes 99 percent of points given as in-zone when test points are spread uniformly across a circle also centred on the home zone with a radius scaled appropriately for the environment.

For urban environments, an average cell site separation of 250 meters is used, with a mixture of umbrella and micro sites. A circle of radius 3 km is used in measuring leakage.

For suburban environments, an average cell site separation of 2 km is assumed, and a circle of radius 6 km is used in measuring leakage.

For rural environments an average cell site separation of 5 km is assumed and a circle of radius 12 km is used in measuring leakage.

RxLev measurements are assumed to be available for a maximum of 6 neighbour cells in any one measurement cycle. (As discussed previously, in one embodiment of the present invention, a greater number of measurements may be obtained from the mobile terminal, enabling greater performance).

TABLE 11

| Information used | Urban | Suburban | Rural |
|---|---|---|---|
| CID only | 200 m-1 km | 1.5 km-8 km | 4 km-15 km |
| CID plus round trip delay | 200 m-1 km | 600 m-3 km | 600 m-5 km |
| CID + rxLevs | 20 m-200 m | 100 m-800 m | 150 m-1500 m |
| CID + rxLevs + round trip delay | 20 m-200 m | 100 m-600 m | 150 m-1000 m |

UMTS Network—Leakage Area

Assume CPICH RSCP measurements are available for all cells in the active and monitored sets Assume round trip delay is available for all cells in the active set

TABLE 12

| Information used | Urban | Suburban | Rural |
|---|---|---|---|
| CID only | 200 m-1 km | 1.5 km-8 km | 4 km-15 km |
| CID plus round trip delay | 200 m-1 km | 500 m-3 km | 500 m-5 km |
| CID + CPICH RSCP | 20 m-250 m | 75 m-800 m | 150 m-1500 m |
| CID + CPICH RSCP + round trip delay | 20 m-200 m | 75 m-500 m | 100 m-900 m |

CDMA Network—Leakage Area

TABLE 13

| Information used | Urban | Suburban | Rural |
|---|---|---|---|
| BASE ID only | 200 m-1.2 km | 1.5 km-10 km | 4 km-18 km |
| BASE ID plus round trip delay | 200 m-1 km | 500 m-3 km | 500 m-5 km |
| BASE ID + PICH power | 20 m-300 m | 75 m-900 m | 150 m-1.6 km |
| BASE ID + PICH power + PN offset | 20 m-250 m | 75 m-600 m | 100 m-1 km |

Once a determination has been made as to whether the user is in or out of the defined zone, there are a variety of actions that may be taken depending on the outcome of this determination. The mobile communications operator can configure the system according to preferences for operating the service. Options include:

Storing the current status at the mobile 20 for use when the user initiates a call or other service;

Updating an indicator on the mobile 20 display so that the user is aware of the tariff that will apply if they initiate any service from their present location;

If there is a change of state (that is going from an in-zone to an out-of-zone state), sending a message to notify a network based entity of the updated state. This indication could be sent via Short Message Service (SMS), General Packet Radio Service (GPRS), Unstructured Supplementary Service Data (USSD), Wireless Application Protocol (WAP) or an alternative wireless bearer. In this case, the mobile terminal may optionally include some or all of the measurements upon which the determination was based for further processing by the server;

If a call is initiated, sending an associated message to notify the relevant network entities of the call rate that should apply or alternatively modify the call setup signalling to enable the network to apply the correct rate.

In some applications of the present invention, the service associated with the zone may be designed to have a short duration only. In this case, the profile definition may be associated with a lifetime parameter which represents the duration for which the profile should remain in effect. After this time the mobile terminal may discard the profile. In one example the zone may be associated with a time limited marketing offer being designed to alert either the user or a merchant of the user's proximity to a merchant's premises. On expiration of the lifetime the mobile terminal may optionally discard the profile without any further signalling with other network entities in order to minimise network traffic.

The present invention is also applicable to a buddy finder service. This type of service enables a group of mobile subscribers to register as a collective. At any time a member of the group can issue a request to the system to determine whether any of the other members of the group are nearby. An alternative to an immediate request is to register a request with a defined time period, for instance for the remainder of the evening.

Once a group of subscribers are registered, a user will typically contact the server to register a request, optionally specifying an expiry time for the request as well as a geographical proximity threshold. If the request is issued from a mobile terminal, the terminal may send back a set of measurements to a server. In such a case the server can develop a profile based on those measurements. The user may also issue the request via an alternative means, specifying a location or a region in geographic coordinates or civic address terms. On receipt of such a request, the server translates creates a profile based on either predicted data, historic profile data or a combination of both. The created profile can take into account the proximity threshold specified by the requester. The created profile can also take into account the location of the requester to which the requester subscribes, tailoring the profile to the environment. It is possible that members of a group will be subscribed to different mobile networks. In this case, the server uses tailors the profile for that each network.

Once the server has created a profile, this profile is then sent to the mobile terminal of other members of the buddy list. On receipt of a message bearing the profile, the application on the mobile terminal adds the profile to its current list of profiles. In the event that a member of the buddy list does not have a suitable application on the terminal, a text based message can be transmitted instead bearing a street and suburb oriented address informing the recipient that the user has requested notification of any buddies in that vicinity.

In the event that the application in one of the mobiles detects a match between the profile and the current filtered measurements, it will compose an alert message identifying the trigger criteria and containing the current filtered measurements. It will then transmit this alert message to the server. The server can then send a message to the original requester alerting him or her that a buddy has been identified who meets the requested criteria.

The server can also process the measurements, checking the result against the original criteria specified by the user as well as the proximity threshold in order to reduce the risk of false alarm. This is because the server has greater processing power than the mobile terminal and also may have additional information.

This description deals only with the case of one person setting a profile to other people in a group. Clearly each person on the group could also send their own profile to other members of the group.

As an example of this application, consider a person, Jodie, in a shopping centre who wishes to be informed if two of her friends, Jean and Jennifer come into the shopping centre. Jodie, chooses a buddy finder menu on her mobile terminal. The application would request from Jodie the size of the zone and the duration of the request. For a shopping centre the size of the zone might be 200 meters and the duration might be 3 hours. The mobile terminal then sends a set of filtered measurements to the server, the duration of the request, and the size of the zone. The server generates a profile, as described earlier in the present application. The profile is then sent to applications on Jean and Jennifer's mobiles. Optionally a message might be displayed on Jean's mobile informing her that Jodie would like to be notified if Jean comes in the vicinity of her within the next three hours. In this case if Jean accepts the request, then the profile is added to any other profiles in Jean's mobile terminal. A similar set of actions occurs at Jennifer's mobile. For the next three hours Jean's mobile compares the profile representing the area where Jodie issued the request with the current measurements. If there is a match, then a message is sent to the server. The server then sends a message to Jodie's mobile informing her that Jean is nearby. Jodie can then call Jodie or take some other action. A similar set of actions can occur with respect to Jennifer's mobile.

In another embodiment of the present aspect, Jodie's mobile can monitor its own location using the profile previously defined and the current measurements. When Jodie moves by more than a configurable threshold, her mobile can notify the server, either to update the existing profiles in Jean and Jennifer's mobiles representing her location or else to extinguish those profiles.

One advantage of an embodiment of the present invention in relation to this application accrues when the processing to monitor the zones of the target mobile terminals is performed at those terminals. This eliminates the need for periodic polling that would exist if the location monitoring were to be carried out at a network based server, and the attendant network load to obtain the measurements for this purpose. Furthermore, the distribution of the processing in this way leads to a scaling advantage since the workload is distributed across the participants' terminals.

Figure 25:
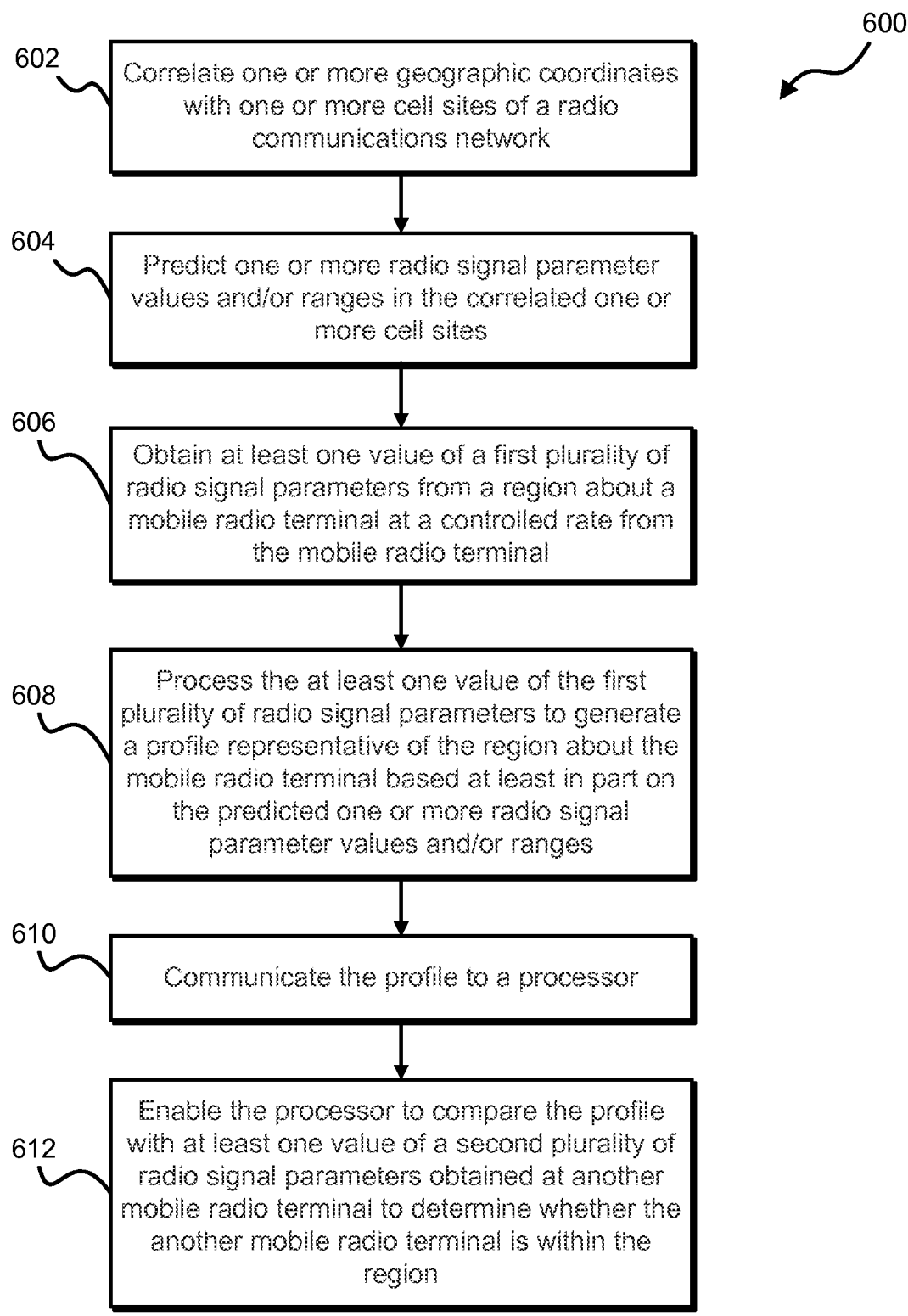
FIG. 25—is a process flow chart of the method used in generating a profile representative of a region.

Referring to FIG. 25, a method 600 for generating a profile representative of a region expressed as one or more geographic coordinates about a mobile radio terminal in a radio communications network is shown. The method includes correlating the one or more geographic coordinates with one or more cell sites of the radio communications network (step 602). One or more radio signal parameter values and/or ranges are predicted in the correlated one or more cell sites (step 604). At least one value of a first plurality of radio signal parameters are obtained from the region about the mobile radio terminal at a controlled rate from the mobile radio terminal (step 606), wherein the radio communications network preferably controls the rate at which the mobile radio terminal transmits the at least one value of the first plurality of radio signal parameters from the region about the mobile radio terminal to the radio communications network for controlling a communications load on the radio communications network. The at least one value of the first plurality of radio signal parameters is processed to generate the profile representative of the region about the mobile radio terminal based at least in part on the predicted one or more radio signal parameter values and/or ranges in the correlated one or more cell sites (step 608). The profile is communicated to a processor (step 610), and the processor is enabled to compare the profile with at least one value of a second plurality of radio signal parameters obtained at another mobile radio terminal to determine whether the another mobile radio terminal is within the region (step 612).

The enhanced zone determination obtained by the various aspects of the present invention may be useful in many other applications, including, but not limited to:

Self navigation (for example as an alternative to GPS systems); Location Based Services (LBS) in which a telecommunications service provider can tailor communication and other services depending upon the subscriber's location at any one time; emergency/rescue location services; tracking of individual persons, for example to alert a parent that her child carrying a mobile phone has traveled outside of a "safety zone" of a path between the child's home and the child's school; geographically-based entertainment and gaming applications, transport fleet management systems, and any other application where knowledge of the location of a mobile or a person associated with a mobile may be used.

It will be understood that the term "comprise" and any of its derivatives (e.g. comprises, comprising) as used in this specification is to be taken to be inclusive of features to which it refers, and is not meant to exclude the presence of any additional features unless otherwise stated or implied.

The invention claimed is:

1. A method for generating a profile representative of a region expressed as one or more geographic coordinates about a mobile radio terminal in a radio communications network, the method comprising:
correlating the one or more geographic coordinates with one or more cell sites of the radio communications network;
predicting one or more radio signal parameter values and/or ranges in the correlated one or more cell sites;
obtaining at least one value of a first plurality of radio signal parameters from the region about the mobile radio terminal at a controlled rate from the mobile radio terminal, wherein the radio communications network controls the rate at which the mobile radio terminal transmits the at least one value of the first plurality of radio signal parameters from the region about the mobile radio terminal to the radio communications network for controlling a communications load on the radio communications network;
processing the at least one value of the first plurality of radio signal parameters to generate the profile representative of the region about the mobile radio terminal based at least in part on the predicted one or more radio signal parameter values and/or ranges in the correlated one or more cell sites; and
communicating the profile to a processor;
such that the processor is enabled to compare the profile with at least one value of a second plurality of radio signal parameters obtained at another mobile radio terminal to determine whether the another mobile radio terminal is within the region.

2. A method as claimed in claim 1 wherein the at least one value of the first plurality of radio signal parameters is obtained by the mobile radio terminal.

3. A method as claimed in claim 1 wherein the at least one value of the first plurality of radio signal parameters is obtained by a radio communications network device in the region about the mobile radio terminal.

4. A method as claimed in claim 1 wherein the at least one value of the first plurality of radio signal parameters is obtained by intercepting a communication between the mobile radio terminal and the radio communications network.

5. A method as claimed in claim 1 wherein at least one of the first plurality of radio signal parameters is a cell ID.

6. A method as claimed in claim 1 wherein the step of processing the at least one value of the first plurality of radio signal parameters is performed at the mobile radio terminal.

7. A method as claimed in claim 1 wherein the step of processing the at least one value of the first plurality of radio signal parameters is performed at a network processor of the radio communications network.

8. A method as claimed in claim 7 wherein the at least one value of the first plurality of radio signal parameters are transmitted from the mobile radio terminal to the network processor for processing to generate the profile.

9. A method as claimed in claim 1 wherein the step of processing the at least one value of the first plurality of radio signal parameters is performed at a processor external to the radio communications network.

10. A method as claimed in claim 9 wherein the at least one value of the first plurality of radio signal parameters are transmitted from the mobile radio terminal to the processor external to the radio communication network for processing to generate the profile.

11. A method as claimed in claim 1 wherein the processor is: at a radio communication network element, external to the radio communications network, or in the mobile radio terminal.

12. A method as claimed in claim 1 wherein the step of processing the at least one value of the first plurality of radio signal parameters comprises averaging a plurality of values.

13. A method as claimed in claim 1 wherein the first plurality of radio signal parameters comprises one or more of a channel frequency identifier and an identifying code.

14. A method as claimed in claim 13 wherein the radio communications network is a GSM system and the channel, frequency identifier is the Absolute Radio Frequency Channel Numbers (ARFCN) and the identifying code is a Base Station Identity Code (BSTC).

15. A method as claimed in claim 1 wherein the at least one value of the first plurality of radio signal parameters is validated.

16. A method as claimed in claim 15 wherein the step of validating comprises calculating an approximate location of the mobile radio terminal and comparing the approximate location with a location associated with the region represented by the generated profile.

17. A method as claimed in claim 16 wherein if the approximate location of the mobile radio terminal and the location associated with the region are within a given distance of each other, accepting the at least one measurement, otherwise rejecting the at least one measurement.

18. A method as claimed in claim 1 wherein the step of obtaining the at least one value of the first plurality of radio signal parameters is controlled to control the extent of the region.

19. A method as claimed in claim 18 wherein the step of obtaining the at least one value of the first plurality of radio signal parameters is controlled by controlling a period of time during which the at least one value of the first plurality of radio signal parameters are obtained.

20. A method as claimed in claim 18 wherein the step of obtaining the at least one value of the first plurality of radio signal parameters is controlled by an external operator.

21. A method as claimed in claim 1 wherein at least one of the first plurality of radio signal parameters is an ambiguous radio signal parameter and at least one of the first plurality of radio signal parameters is an unambiguous radio signal parameter.

22. A method as claimed in claim 1 wherein at least one of the at least one values of the first plurality of radio signal parameters is obtained by measurement.

23. A method as claimed in claim 1 wherein at least one of the at least one values of the first plurality of radio signal parameters is predicted.

24. A system configured to perform the method of claim 1.

25. A machine readable medium containing instructions to cause a machine to perform the method of claim 1.

26. A method for determining whether a mobile radio terminal is within a predefined region of a radio communications network expressed as one or more geographic coordinates, the method comprising:
correlating the one or more geographic coordinates with one or more cell sites of the radio communications network;
predicting one or more radio signal parameter values and/or ranges in the correlated one or more cell sites;
obtaining a profile representing the predefined region of a radio communications network based at least in part on the predicted one or more radio signal parameter values and/or ranges in the correlated one or more cell sites, wherein the profile includes at least one value of a first plurality of radio signal parameters obtained at a controlled rate from the mobile radio terminal, wherein the radio communications network controls the rate at which the mobile radio terminal transmits the at least one value of the first plurality of radio signal parameters from the mobile radio terminal to the radio communications network for controlling a communications load on the radio communications network;

obtaining at least one value of a second plurality of radio signal parameters from a region about another mobile radio terminal;

comparing the profile representing the predefined region with the at least one value of the second plurality of radio signal parameters corresponding to the another mobile radio terminal; and determining whether the another mobile radio terminal is within the predefined region on the basis of the comparison.

27. A method as claimed in claim 26 wherein the step of comparing the profile representing the predefined region with the at least one value of the second plurality of radio signal parameters is conducted by the mobile radio terminal.

28. A method as claimed in claim 26 wherein the step of comparing the profile representing the predefined region with the at least one value of the second plurality of radio signal parameters is conducted at a radio communications network element.

29. A method as claimed in claim 24 wherein the step of comparing the profile representing the predefined region with the at least one value of the second plurality of radio signal parameters is conducted at a processor external to the radio communications network element.

30. A method as claimed in claim 26 wherein there are a plurality of predefined regions, each having a respective representative profile.

31. A method as claimed in claim 30 wherein two or more of the plurality of predefined regions overlap.

32. A method as claimed in claim 31 wherein the at least one value of the second plurality of radio signal parameters is transmitted upon receiving a request from the radio communications network.

33. A method as claimed in claim 31 wherein the at least one value of the second plurality of radio signal parameters is transmitted upon receiving a request from a processor external to the radio communications network.

34. A method as claimed in claim 26 wherein least one of the at least one value of the second plurality of radio signal parameters is obtained by measurement.

35. A method as claimed in claim 34 wherein the at least one value of the second plurality of radio signal parameters is transmitted upon the user of the another mobile radio terminal initiating a call.

36. A method as claimed in claim 26 wherein least one of the at least one value of the second plurality of radio signal parameters is predicted.

37. The method of claim 26 further comprising the step of: transmitting from the another mobile radio terminal, the at least one value of the second plurality of radio signal parameters to a processor for comparison with the profile of the predefined region.

38. A method as claimed in claim 37 wherein the at least one value of the second plurality of radio signal parameters is transmitted upon initiation by a user of the another mobile radio terminal.

39. The method of claim 26 further comprising the step of: transmitting the determination to a processor.

40. A method as claimed in claim 39 wherein the processor is a processor in the radio communications network.

41. A method as claimed in claim 39 wherein the processor is a processor external to the radio communications network.

42. A method as claimed in claim 39 wherein the determination is transmitted to the processor upon initiation by a user of the mobile radio terminal.

43. A method as claimed in claim 39 wherein the determination is transmitted to the processor upon the user of the mobile radio terminal initiating a call.

44. A method as claimed in claim 39 wherein the determination is transmitted to the processor upon receiving a request from the radio communications network.

45. A method as claimed in claim 39 wherein the determination is transmitted to the processor upon receiving a request from external to the radio communications network.

46. A method as claimed in claim 39 wherein the determination is transmitted to the processor upon a change of the determination.

47. A method as claimed in claim 26 wherein the step of comparing comprises:

calculating a cost C associated with the at least one value of the second plurality of radio signal parameters and the profile; and comparing the cost C with a threshold.

48. A method as claimed in claim 47 wherein the cost C is calculated as follows:

$$C = C_m + C_{um} + C_{ur}$$

where
$C_m$ = Cost associated with cells that are observed and are matched in the profile
$C_{um}$ = Cost associated with cells that are observed but are not matched in the profile
$C_{ur}$ = Cost associated with cells that are in the profile but are not reported.

49. A method as claimed in claim 48 wherein each of $C_m$, $C_{um}$ and $C_{ur}$ are calculated as follows:

$$C_m = \sum_{i=1}^{N_m} \frac{(r_{pi} - r_{oi})^2}{2\sigma^2}$$

$$C_{um} = \sum_{i=1}^{N_m + N_{um}} \frac{(r_{pi} - t_{um})^2}{2\sigma^2}; \text{ and}$$

$$C_u = -\sum_{i=N_m+N_{um}+1}^{N_m+N_{um}+N_{ur}} \log\left[\frac{1}{2}\left(1 + \text{erf}\left(\frac{t_{ur} - r_{pi}}{\sqrt{2}\sigma}\right)\right)\right].$$

50. A method as claimed in claim 48 wherein:
$C < \chi^2 (x, N_T - 2)$ than in Zone
otherwise, not in Zone,
where
$\chi^2$ is the standard statistical function, $$N_T = N_m + N_{um} + N_{ur}.$$

x = a percentage between 0 and 100.

51. The method of claim 26 further comprising:
associating a threshold with a ratio of a probability of an Out-Given-In error and a probability of an In-Given-Out error; and
adjusting the threshold to achieve a desired performance.

52. A method as claimed in claim 51 wherein the threshold may be adjusted from about 0% to about 100%.

53. A method as claimed in claim 51 wherein the size of the region increases as the probability of in-given-out errors increases.

54. A method as claimed in claim 26 wherein the mobile radio terminal transmits data relating to radio signal parameters about the mobile radio terminal.

\* \* \* \* \*

UNITED STATES PATENT AND TRADEMARK OFFICE
CERTIFICATE OF CORRECTION

PATENT NO. : 8,463,285 B2  
APPLICATION NO. : 11/887948  
DATED : June 11, 2013  
INVENTOR(S) : Macnaughtan et al.

Page 1 of 1

It is certified that error appears in the above-identified patent and that said Letters Patent is hereby corrected as shown below:

IN THE CLAIMS

At claim 14, column 36, line 15, after the word "Code" delete "(BSTC)" and insert therefore --(BSIC)--.

Signed and Sealed this  
Thirteenth Day of August, 2013

Teresa Stanek Rea  
*Acting Director of the United States Patent and Trademark Office*